US012031868B2

United States Patent
Ersoy

(10) Patent No.: US 12,031,868 B2
(45) Date of Patent: Jul. 9, 2024

(54) TOTAGRAPHY: COHERENT DIFFRACTIVE/DIGITAL INFORMATION RECONSTRUCTION BY ITERATIVE PHASE RECOVERY USING SPECIAL MASKS

(71) Applicant: Gerchberg Ophthalmic Dispensing, PLLC, New York, NY (US)

(72) Inventor: Okan Ersoy, West Lafayette, IN (US)

(73) Assignee: Wavefront Analysis Systems LLC, New York, NY (US)

( * ) Notice: Subject to any disclaimer, the term of this patent is extended or adjusted under 35 U.S.C. 154(b) by 51 days.

(21) Appl. No.: 17/553,144

(22) Filed: Dec. 16, 2021

(65) Prior Publication Data

US 2022/0187138 A1 Jun. 16, 2022

Related U.S. Application Data

(62) Division of application No. 17/120,919, filed on Dec. 14, 2020, now Pat. No. 11,237,059.

(51) Int. Cl.
*G01J 9/02* (2006.01)
*G01J 3/02* (2006.01)
(Continued)

(52) U.S. Cl.
CPC .............. *G01J 9/02* (2013.01); *G01J 3/0229* (2013.01); *G01J 3/28* (2013.01); *G01J 2003/283* (2013.01);
(Continued)

(58) Field of Classification Search
CPC .... G01J 9/02; G01J 3/0229; G01J 3/28; G01J 2003/283; G01J 2003/284;
(Continued)

(56) References Cited

U.S. PATENT DOCUMENTS 3,604,778 A 9/1971 Burckhardt
3,917,380 A 11/1975 Kato et al.
(Continued)

FOREIGN PATENT DOCUMENTS

JP 7246093 B2 * 3/2023 ............... G01B 9/02

OTHER PUBLICATIONS

Soldevila et al. "Phase imaging by spatial wavefront sampling", 2017, downloaded from https://arxiv.org/abs/1711.04130.*
(Continued)

*Primary Examiner* — Mohamed K Amara
(74) *Attorney, Agent, or Firm* — Riverside Law LLP

(57) ABSTRACT

A totagram is produced by an iterative spectral phase recovery process resulting in complete information recovery using special masks, without a reference beam. Using these special masking systems reduce computation time, number of masks, and number of iterations. The special masking system is (1) a unity mask together with one or more bipolar binary masks with elements equal to 1 and −1, or (2) a unity mask together with one or more phase masks, or (3) a unity mask together with one pair of masks or more than one pair of masks having binary amplitudes of 0's and 1's, in which the masks in the pair are complementary to each other with respect to amplitude, or (4) one or more pairs of complementary masks with binary amplitudes of 0's and 1's without a unity mask.

27 Claims, 18 Drawing Sheets

(51) Int. Cl.
*G01J 3/28* (2006.01)
*G03H 1/08* (2006.01)
*G03H 1/16* (2006.01)

(52) U.S. Cl.
CPC . *G01J 2003/284* (2013.01); *G01J 2009/0238* (2013.01); *G03H 1/0866* (2013.01); *G03H 1/0891* (2013.01); *G03H 1/16* (2013.01)

(58) Field of Classification Search
CPC .. G01J 2009/0238; G01J 9/00; G03H 1/0866; G03H 1/0891; G03H 1/16; G03H 1/2645; G03H 1/0465; G03H 2001/0447; G03H 2001/0454; G03H 2001/0458; G03H 2001/046; G03H 2001/0816; G03H 2210/441; G03H 2223/12; G03H 2223/13; G03H 1/0443
See application file for complete search history.

(56) References Cited

U.S. PATENT DOCUMENTS

| | | | |
|---|---|---|---|
| 4,037,918 A | 7/1977 | Kato | |
| 4,791,584 A * | 12/1988 | Greivenkamp, Jr. | G01B 9/0201 356/513 |
| 4,832,489 A * | 5/1989 | Wyant | G01B 9/02039 356/513 |
| 4,949,389 A * | 8/1990 | Allebach | G06V 10/88 359/559 |
| 4,953,188 A * | 8/1990 | Siegel | G02B 21/14 359/368 |
| 5,050,220 A * | 9/1991 | Marsh | G06V 40/1365 382/210 |
| 5,086,222 A * | 2/1992 | Shibuya | G02B 21/002 250/234 |
| 5,274,716 A * | 12/1993 | Mitsuoka | G06E 3/005 382/280 |
| 5,426,521 A * | 6/1995 | Chen | G02B 27/46 359/9 |
| 5,454,047 A * | 9/1995 | Chang | G06T 9/007 382/280 |
| 5,768,242 A * | 6/1998 | Juday | G03H 1/0005 |
| 5,835,217 A * | 11/1998 | Medecki | G01J 9/02 356/521 |
| 6,229,649 B1 * | 5/2001 | Woods | G06V 10/88 382/254 |
| 6,369,932 B1 | 4/2002 | Gerchberg | |
| 6,545,790 B2 | 4/2003 | Gerchberg | |
| 6,639,683 B1 * | 10/2003 | Tumbar | G01B 9/02041 356/512 |
| 6,906,839 B2 | 6/2005 | Gerchberg | |
| 7,079,251 B2 * | 7/2006 | Millerd | G01B 9/02083 356/450 |
| 7,298,497 B2 * | 11/2007 | Millerd | G01N 21/45 356/512 |
| 7,460,245 B2 * | 12/2008 | Hill | G01B 9/0207 356/517 |
| 7,808,648 B2 * | 10/2010 | Sandstrom | G01N 21/21 356/495 |
| 8,040,595 B2 | 10/2011 | Gerchberg | |
| 8,184,298 B2 | 5/2012 | Popescu et al. | |
| 8,363,316 B2 * | 1/2013 | Asundi | G03H 1/0866 359/368 |
| 8,520,213 B2 | 8/2013 | Popescu et al. | |
| 8,837,045 B2 | 9/2014 | Popescu et al. | |
| 9,052,180 B2 | 6/2015 | Popescu et al. | |
| 9,404,857 B2 | 8/2016 | Popescu et al. | |
| 9,715,098 B2 | 7/2017 | Babacan et al. | |
| 9,921,111 B2 * | 3/2018 | Bahk | G03F 7/706 |
| 10,132,609 B2 | 11/2018 | Popescu et al. | |
| 10,162,161 B2 * | 12/2018 | Horstmeyer | G02B 21/361 |
| 11,099,007 B2 * | 8/2021 | Goodwin | G03F 7/70291 |
| 2002/0060831 A1 * | 5/2002 | Gerchberg | G03H 1/0808 359/237 |
| 2003/0030819 A1 * | 2/2003 | Kuechel | G01B 9/02059 356/512 |
| 2005/0249095 A1 | 11/2005 | Tanaka et al. | |
| 2007/0058174 A1 * | 3/2007 | Hill | G01J 9/02 356/512 |
| 2011/0085173 A1 | 4/2011 | Waller et al. | |
| 2016/0004221 A1 * | 1/2016 | Ayres | G03H 1/2645 359/30 |
| 2017/0003491 A1 | 1/2017 | Waller et al. | |
| 2017/0059845 A1 | 3/2017 | Waller et al. | |
| 2017/0146788 A1 | 5/2017 | Waller et al. | |
| 2018/0024008 A1 | 1/2018 | Okamoto et al. | |
| 2018/0048811 A1 | 2/2018 | Waller et al. | |
| 2019/0107655 A1 | 4/2019 | Waller et al. | |
| 2019/0187612 A1 | 6/2019 | Sato | |
| 2019/0204074 A1 * | 7/2019 | Goodwin | G03F 7/70075 |
| 2019/0227490 A1 | 7/2019 | Waller et al. | |
| 2019/0310374 A1 | 10/2019 | Gerchberg et al. | |
| 2019/0369411 A1 * | 12/2019 | Piestun | G02B 27/4205 |
| 2020/0146545 A1 * | 5/2020 | Kumar | G01J 9/02 |
| 2020/0249095 A1 * | 8/2020 | Milster | G01J 9/02 |
| 2020/0403839 A1 * | 12/2020 | Carvalho | H03M 1/0614 |
| 2022/0187138 A1 * | 6/2022 | Ersoy | G03H 1/0465 |

OTHER PUBLICATIONS

Yuan et al. "Phase Retrieval via Reweighted Wirtinger Flow," Appl. Opt., vol. 56, No. 9, pp. 1-21, Mar. 2017.

Yurtsever et al. "Sketchy Decisions: Convex Low-Rank Matrix Optimization with Optimal Storage," pp. 1-16, Feb. 22, 2017.

Zeng et al. "Coordinate Descent Algorithms for Phase Retrieval," IEEE, pp. 1-13, Jun. 2017.

Zheng et al. "Wide-field, High-resolution Fourier Ptychographic Microscopy," Nature Photonics, pp. 739-745, vol. 7, No. 9, Sep. 1, 2013.

Bourquard et al. "A practical inverse-problem approach to digital holographic reconstruction," Optics Express, vol. 21, No. 3, pp. 3417-3433, Feb. 11, 2013.

Chandra et al. "PhasePack User Guide," https://github.com/tomgoldstein/phasepack-matlab, pp. 1-20, Nov. 29, 2017.

Cheng et al. "Phase retrieval and diffractive imaging based on Babinet's principle and complementary random sampling," Optics Express, vol. 23, No. 22, pp. 28874-28882, Nov. 2, 2015.

Eguchi et al. "Single-shot phase retrieval with complex diversity," Optics Letters, vol. 44, Issue 21, pp. 5108-5112, 2019.

Horisaki, et al. "Single-shot phase imaging with a coded aperture," Optics Letters, vol. 39, No. 22, pp. 6466-6469, Nov. 15, 2014.

Pozzi et al. "Fast Calculation of Computer Generated Holograms for 3D Photostimulation through Compressive-Sensing Gerchberg-Saxton Algorithm," Methods and Protocols, pp. 1-11, 2019.

Acquire mass and volume information in real time with label-free, quantitative imaging for live cells, assays, tissues and organoids, Phioptics, https://phioptics.com, 3 pages, 2020.

"The Optical Computing Revolution Optalysys," Optalysys, https://www.optalysys.com, 8 pages, 2020.

"Spacial Light Modulators," Phase Modulation, https://www.meadowlark.com/spatial_light_modulators.php, 4 pages, 2020.

Abbey et al. "Lensless Imaging Using Broadband X-Ray Sources," Nature Photonics, pp. 420-424, Jun. 26, 2011.

Ahderom et al. "Applications of Liquid Crystal Spatial Light Modulators in Optical Communications," Proceedings of 5th IEEE International Conference on High Speed Networks and Multimedia Communications, Jeju Island, Korea, pp. 239-242, 2002.

Bahmani et al. "Phase Retrieval Meets Statistical Learning Theory: A Flexible Convex Relaxation," School of Electrical and Computer Engineering, Georgia Institute of Technology, 17 pages, 2016.

Barbastathis et al. "On the Use of Deep Learning for Computational Imaging," Optica, vol. 6, No. 8, pp. 921-943, Aug. 2019.

Bauschke, et al. "Hybrid Projection-Reflection Method for Phase Retrieval," J. Optical Soc. Am. A, vol. 20, No. 6, pp. 1025-1034, Jun. 2003.

(56) References Cited

OTHER PUBLICATIONS

Bendory et al. "Fourier Phase Retrieval Uniqueness and Algorithms," The Program in Applied and Computational Mathematics, Princeton University, pp. 1-44, 2017.
Bian et al. "Fourier Ptychographic Reconstruction Using Wirtinger Flow Optimization," Optics Express, vol. 23, No. 4, pp. 4856-4866, 2015.
Canon U.S.A., Inc., https://www.usa.canon.com/internet/portal/us/home/products/details/cameras/eos-dslr-and-mirrorless-cameras/dslr/eos-5ds-r, 2 pages, 2020.
Candes et al. "Phaselift: Exact and Stable Signal Recovery from Magnitude Measurements via Convex Programming," Communications on Pure and Applied Mathematics, pp. 1-31, Sep. 2011.
Candes et al. "Phase Retrieval via Matrix Completion," SIAM J. Imaging Sciences, vol. 6, No. 1, pp. 199-225, 2013.
Candes et al. "Phase Retrieval from Coded Diffraction Patterns," Applied and Computational Harmonic Analysis, Stanford University, pp. 277-299, 2015.
Chandra et al. "Phasepack: A Phase Retrieval Library," IEEE 13th International Conference on Sampling Theory and Applications, pp. 1-5, 2019.
Chen et al. "Phase Retrieval with One or Two Diffraction Patterns by Alternating Projection with Null Initialization," Department of Applied Mathematics, pp. 1-41, 2015.
Chen et al. "Solving Random Quadratic Systems of Equations is Nearly as Easy as Solving Linear Systems," Department of Mathematics and Statistics, Stanford University, pp. 1-45, May 2015.
Cheng et al. "Phase Retrieval and Diffractive Imaging Based on Babinet's Principle and Complemetary Random Sampling, " Optics Express, vol. 23, No. 22, pp. 28874-28882, Nov. 2, 2015.
Dhifallah et al. "Phase Retrieval via Linear Programming: Fundamental Limits and Algorithmic Improvements," Harvard University and Massachusetts Institute of Technology, pp. 1-7, 2017.
Elser "Solution of the Crystallographic Phase Problem by Iterated Projections," Acta Crystallography Section A Foundations Crystallography, pp. 1-14, 2003.
Esroy "Diffraction, Fourier Optics and Imaging," A Wiley-Interscience Publication, Table of Contents, Nov. 2006.
Fienup "Reconstruction of an Object from the Modules of its Fourier Transform," Optics Letters, vol. 3, No. 1, pp. 27-29, Jul. 1978.
Fienup "Phase Retrieval Algorithms: a Comparison," Applied Optics, vol. 21, No. 15, pp. 2758-2769, Aug. 1, 1982.
Fienup "Reconstruction of a Complex-Valued Object from the Modulus of its Fourier Transform using a Support Constraint," Optical Society of America, vol. 4, No. 1, pp. 118-123, Jan. 1987.
Frauel et al. "Resistance of the Double Random Phase Encryption Against Various Attacks," Optical Express, vol. 15, No. 16, pp. 10253-10265, Aug. 6, 2007.
Gabor "A New Microscopic Principle," Nature, vol. 161, pp. 777-778, May 15, 1948.
Gerchberg, et al. "A Practical Algorithm for the Determination of Phase from Image and Diffraction Plane Pictures," Optik, vol. 35, No. 2, pp. 237-246, 1972.
Gerchberg "Super-Resolution Through Error Energy Reduction, " Optica ACTA, vol. 21, No. 9, pp. 709-720, 1974.
Gerchberg "A New Approach to Phase Retrieval of a Wave Front," Journal of Modern Optics, vol. 49, No. 7, pp. 1185-1196, 2002.
Goldstein et al. "Phasemax: Convex Phase Retrieval via Basis Pursuit," pp. 1-15, 2016.
Guizar-Sicairos et al. "Phase Retrieval with Transverse Translation Diversity: A Nonlinear Optimization Approach," Optics Express, vol. 16, No. 10, pp. 7264-7278, May 12, 2008.
Guizar-Sicairos et al. "Phase Retrieval with Fourier-Weighted Projections, "J. Optical Society Am. A, vol. 25, No. 3, pp. 701-709 Mar. 2008.
Holloway et al. "Toward Long Distance Sub-diffraction Imaging Using Coherent Camera Arrays," IEEE Tran. Computational Imaging, vol. 2, Issue 3, pp. 1-13, Sep. 2016.
Holloway et al. "SAVI: Synthetic Apertures for Long Range Sub-diffraction-Limited Visible Imaging Using Fourier Ptychography," Science Advances, vol. 3, No. 4, pp. 1-11, Apr. 14, 2017.
Isil et al. "Deep Iterative Reconstruction for Phase Retrieval," Applied Optics, vol. 58, pp. 1-14, Aug. 20, 2019.
Jaganathan et al. "Phase Retrieval: An Overview of Recent Developments," Department of Electrical Engineering Caltech and Israel Institute of Technology, pp. 1-24, 2015.
Li et al. "On Gradient Descent Algorithm for Generalized Phase Retrieval Problem," pp. 1-14, 2016.
Luke "Relaxed Averaged Alternating Reflections for Diffraction Imaging," Inverse Problems, vol. 21, pp. 37-50, 2005.
Mahajan "Zernike Circle Polynomials and Optical Aberrations of Systems with Circular Pupils," Engineering and Laboratory Notes, R.R. Shannon, Editor, Supplement to Applied Optics, pp. 8121-8124, Dec. 1994.
Marchesini "Phase Retrieval and Saddle-Point Optimization," Journal Optical Society of America, vol. 24, No. 10, pp. 3289-3296, Oct. 2007.
Metzler et al. "Coherent Inverse Scattering via Transmission Matrices: Efficient Phase Retrieval Algorithms and a Public Dataset." In Computational Photography (ICCP), 2017 IEEE International Conference, pp. 1-16, May 2017.
Millane "Phase Retrieval in Crystallography and Optics," Journal Optical Society of America, vol. 7, No. 3, pp. 394-411, Mar. 1990.
Misell "A Method for the Solution of the Phase Problem in Electron Microscopy," Journal of Physics D: Applied Physics, vol. 6, pp. L6-L10,1973.
Mondelli et al. "Fundamental Limits of Weak Recovery with Applications to Phase Retrieval," Proceedings of Machine Learning Research, 31 Annual Conference on Learning Theory, vol. 75, pp. 1-6, 2018.
Refregier "Optical Image Encryption based on Input Plane and Fourier Plane Random Encoding," Optic Letters, vol. 20, No. 7, pp. 767-769, Apr. 1, 1995.
Rivenson et al. "Phase Recovery and Holographic Image Reconstruction Using Deep Learning in Neural Networks," Light: Science & Applications, vol. 7, pp. 1-9, 2018.
Rodenburg et al. "Ptychography and Related Diffractive Imaging Methods," Advances in Imaging and Electron Physics, vol. 150, pp. 87-184, 2008.
Rodriguez et al, "Oversampling Smoothness: an Effective Algorithm for Phase Retrieval of Noisy Diffraction Intensities," Journal of Applied Crystallography, vol. 46, pp. 312-318 , 2013.
Spence "Diffractive (Lensless) Imaging," Ch. 19, Science of Microscopy, edited by P.W. Hawkes, J. C.H. Spence, Springer, pp. 1-2, 2007.
Turpin et al. "Theory of the Synthetic Aperture Microscope," Proceedings of SPIE, Advanced Imaging Technologies and Commercial Applications, vol. 2566, pp. 230-240, Aug. 23, 1995.
Wang et al. "Solving Almost all Systems of Random Quadratic Equations," pp. 1-27, May 29, 2017.
Wang, et al. "Solving Systems of Random Quadratic Equations via Truncated Amplitude Flow," IEEE Transactions on Information Theory, vol. 64, No. 2, pp. 773-794, Feb. 2018.
Wei, "Solving Systems of Phaseless Equations via Kaczmarz Methods: A Proof of Concept Study," Department of Mathematics Hong Kong University of Science and Technology, pp. 1-24, Sep. 1, 2015.

\* cited by examiner

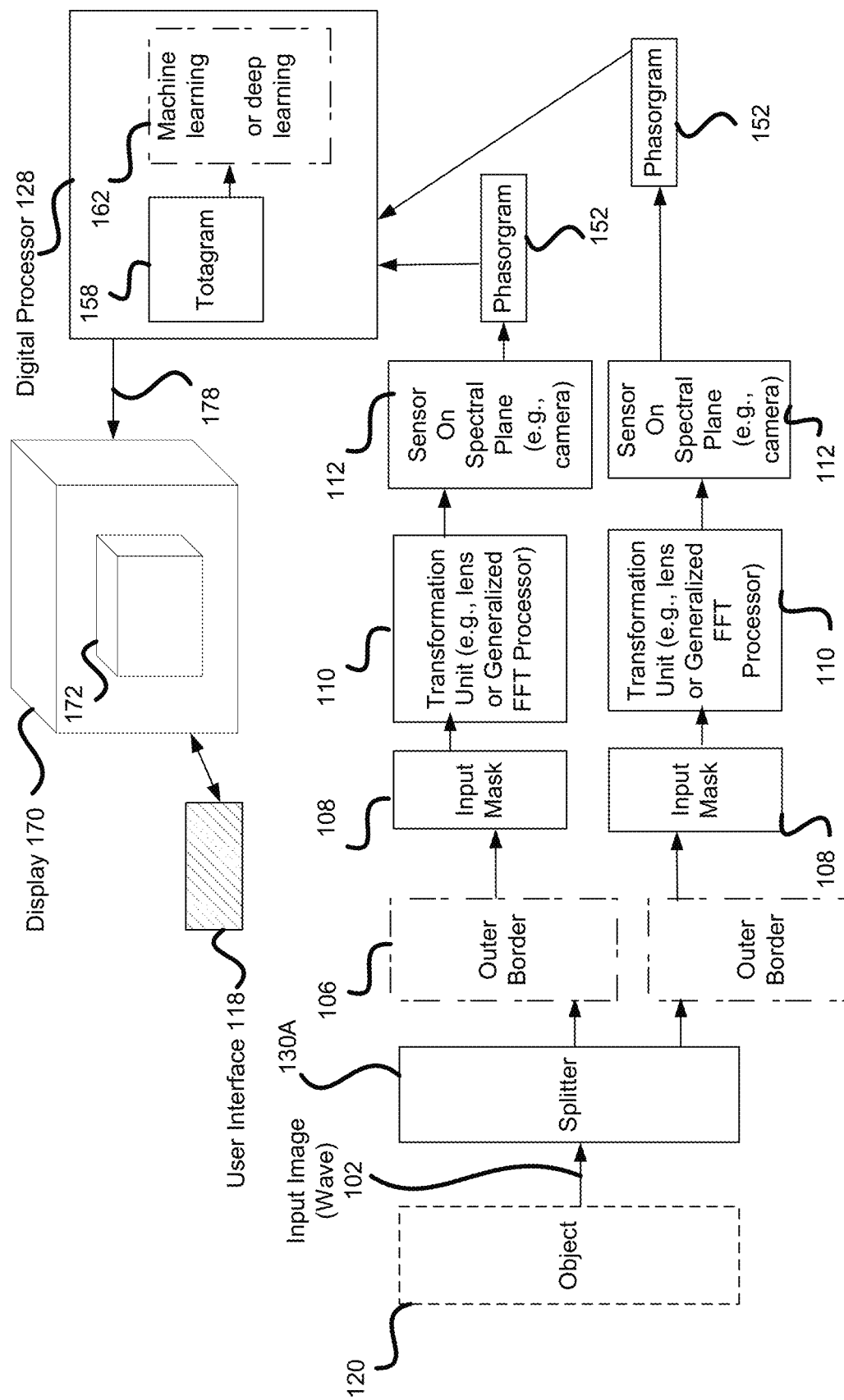
Fig. 1B-I

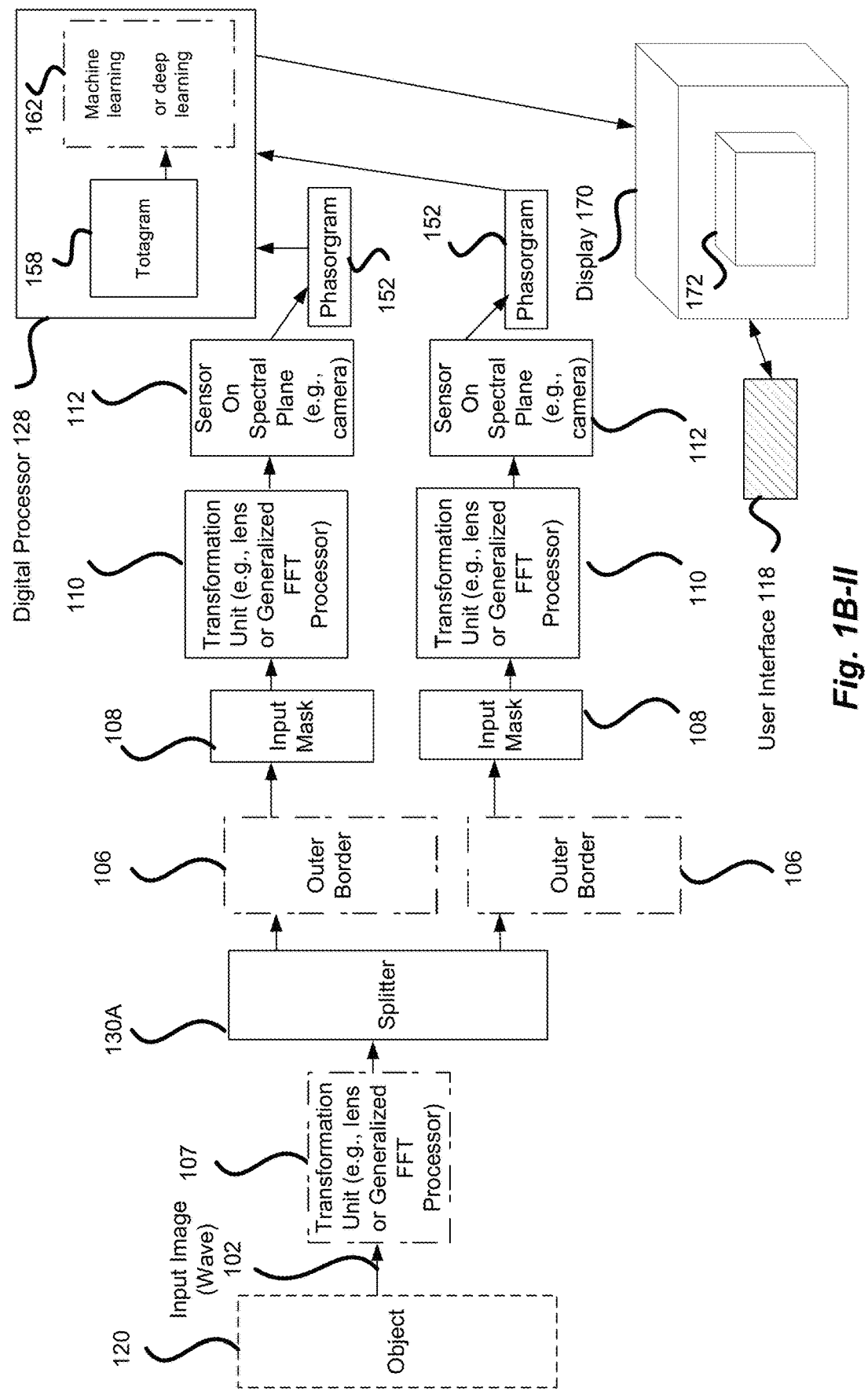
Fig. 1B-II

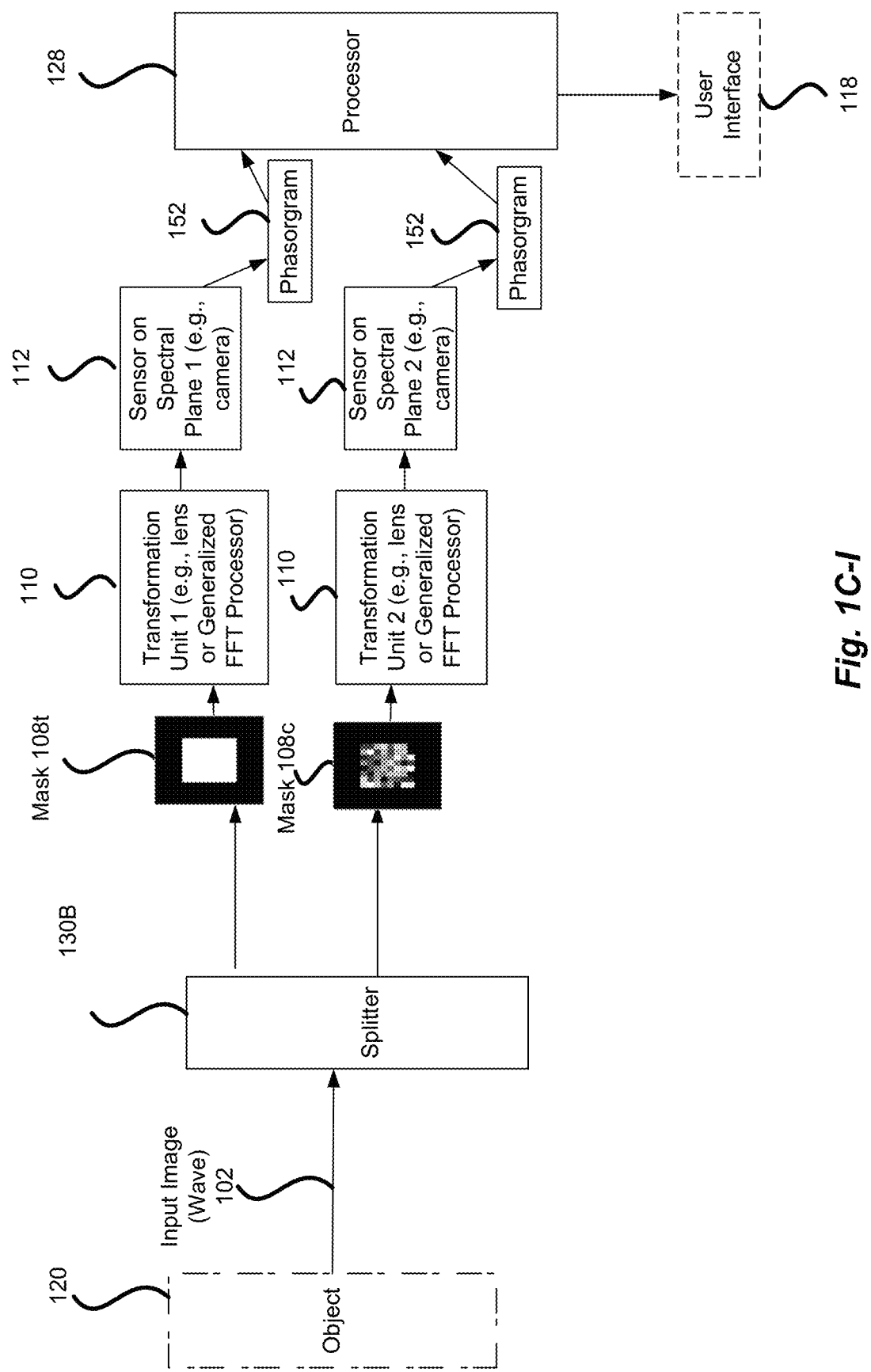
Fig. 1C-I

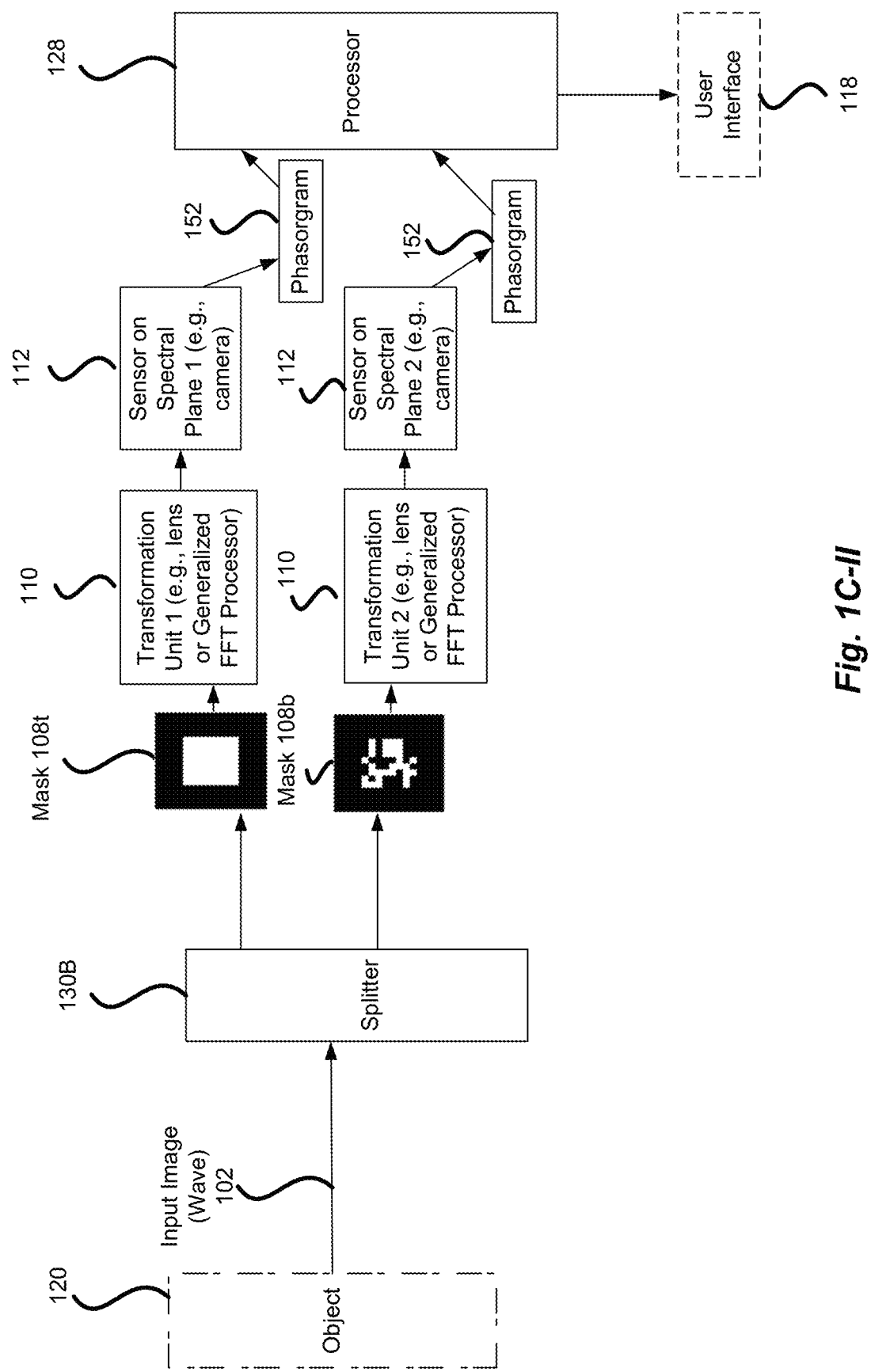
Fig. 1C-II

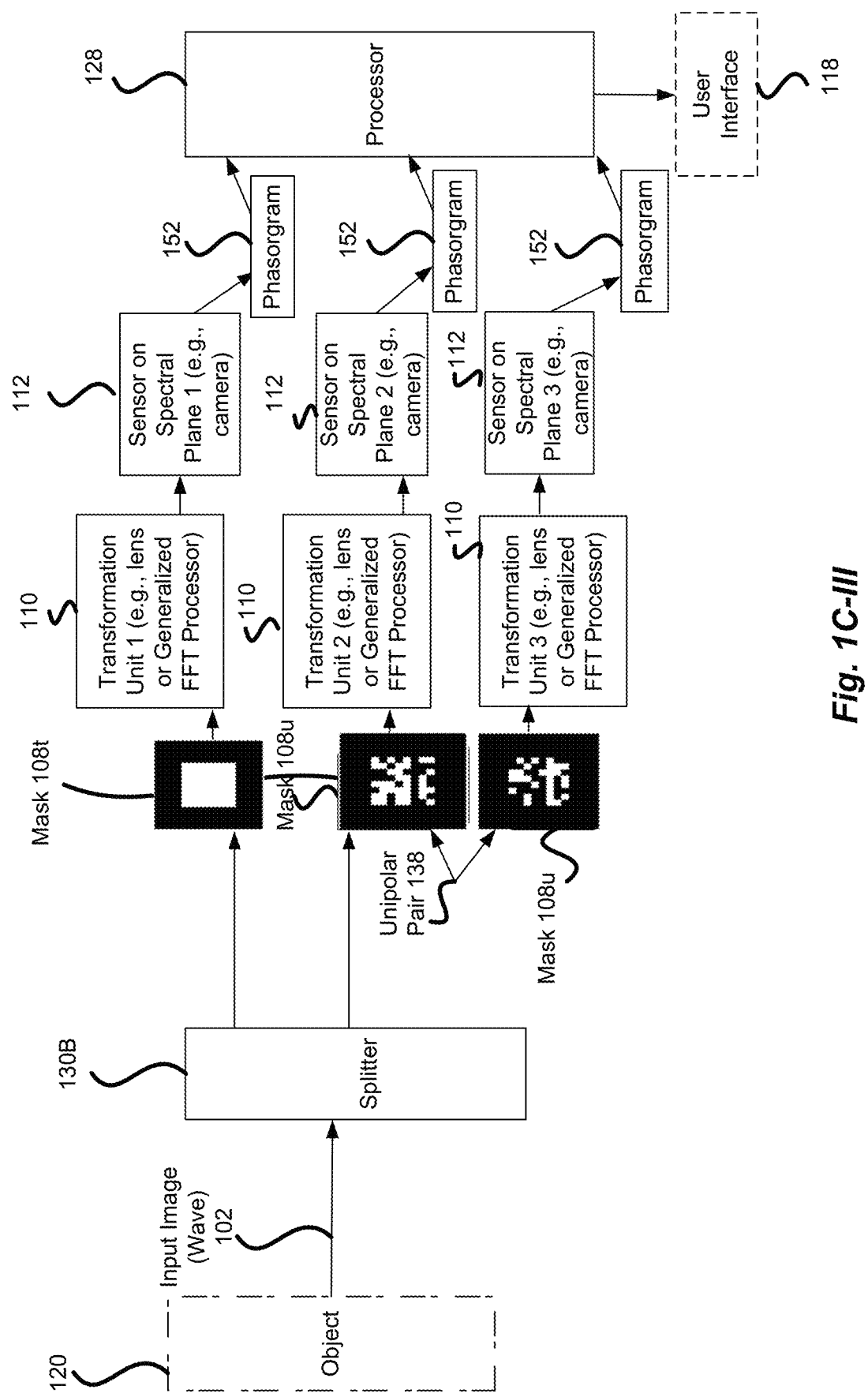
Fig. 1C-III

TOTAGRAPHY: COHERENT DIFFRACTIVE/DIGITAL INFORMATION RECONSTRUCTION BY ITERATIVE PHASE RECOVERY USING SPECIAL MASKS

CROSS-REFERENCE TO RELATED APPLICATION

This application is a divisional of U.S. patent application Ser. No. 17/120,919, filed Dec. 14, 2020 and issued as U.S. Pat. No. 11,237,059, which is hereby incorporated herein by reference in its entirety.

TECHNICAL FIELD

The present invention relates to phase recovery systems and methods. In particular, amplitude and phase are reconstituted for a coherent wave after measuring its amplitude at a spectral output.

BACKGROUND ART

Information embedded in terms of amplitude and phase as in coherent wave representations leads to applications which are 1 or higher dimensional as in imaging. In such systems, phase is often more important than amplitude. In many coherent systems, phase is lost because what is measurable is intensity which is proportional to the square of the amplitude. Phase might also be intentionally lost. Phase recovery is also important with one-dimensional signals in a number of applications such as speech recognition, blind channel estimation, and blind deconvolution. The phase problem goes back to Rayleigh who wrote about it in 1892. Phase recovery has been a celebrated problem in succeeding years, and this process has accelerated after the 1960's when the laser and other important sources of coherent radiation were discovered.

There are indirect ways to recover phase and thereby achieve complete information recovery, for example, in diffractive imaging resulting in 3-D information. Holography discovered by Dennis Gabor is one of them, and it achieves 3-D imaging by introducing a reference wave. This has a lot to do with modulation principles used in communications. Another way is closely related to the Gerchberg-Saxton algorithm (1971-72), also known as the original Gerchberg-Saxton algorithm, and referred to as "GSA" herein, which involves measurements on two related planes, the input plane and the output spectral plane. Advances in a number of areas in science and technology are related to the GSA published in 1972 [R. W. Gerchberg, W. O. Saxton, "A practical algorithm for the determination of the phase from image and diffraction plane pictures," *Optik*, Vol. 35, pp. 237-246, 1972].

R. W. Gerchberg later made an improvement to the GSA by introducing N independent measurement systems on two planes especially by using phase masks. This improvement is known herein as "Gerchberg's second method," or "G2." G2 was published in R. W. Gerchberg, "A New Approach to Phase Retrieval of a Wave Front," *Journal of Modern Optics*, 49:7, 1185-1196, 2002, incorporated by reference in its entirety herein. Further aspects of G2 are described in U.S. Pat. Nos. 6,369,932 B1; 6,545,790; and 8,040,595 all incorporated by reference in their entirety herein.

Unlike holography, G2 does not require a reference wave. Rather, G2 is similar to measuring a quantity of interest in N independent ways and then doing averaging between the results. The patents show how to achieve this in practice when using waves. G2 is believed to be the first such method using multiple measurements for reliable phase recovery. Some other well-known methods for phase recovery are the error reduction (ER) algorithm [, J, R, Fienup, 'Reconstruction of an object from its Fourier transform,' *Optics Letters*, Vol. 3, No 1, pp. 27-29, July 1978; J. R. Fienup, 'Phase retrieval algorithms, a comparison,' *Applied Optics*, Vol. 21, No. 15, pp. 2758-2769, 1 Aug. 1982], the averaged successive relaxations (ASR) [J. C. H. Spence, 'Diffractive (lensless) imaging,' Ch. 19, *Science of Microscopy*, edited by P. W. Hawkes, J. C. H. Spence, Springer, 2007], the hybrid projection reflections (HPR) [H. H. Bauschke, P. L. Combettes, D. Russell Luke, 'Hybrid projection-reflection method for phase retrieval,' *J. Optical Soc. Am. A*, Vol. 20, No. 6, pp. 1025-1034, June 2003], relaxed averaged alternating reflections (RAAR) [D. Russell Luke, 'Relaxed averaged alternating reflections for diffraction imaging,' *Inverse Problems*, Vol. 21, pp. 37-50, 2005], oversampling smoothness (OSS) [J. A. Rodriguez, R. Xu, C.-C. Chen, Y. Zou, and J. Miao, 'Oversampling smoothness: an effective algorithm for phase retrieval of noisy diffraction intensities,' *J. Applied Crystallography*, Vol. 46, pp. 312-318, 2013] and difference maps (DM) [V. Elser, 'Solution of the crystallographic phase problem by iterated projections,' *Acta Crystallography. Section A: Foundations Crystallography*, Vol. 59, pp. 201-209, 2003]. There are a number of algorithms considerably more recent, utilizing more effective optimization methods such as SO2D and SO4D [Stefano Marchesini, 'Phase retrieval and saddle-point optimization,' *J. Optical Soc. Am. A*, Vol. 24, No. 10, pp. 3289-3296, October 2007]. A new benchmark study of many popular phase retrieval algorithms is discussed in PhasePack [R. Chandra, T. Goldstein, C. Studer, 'Phasepack: a phase retrieval library,' IEEE 13th international conference on sampling theory and applications, pp. 1-5, 2019]. In this work, averaging and masking with 8 bipolar binary masks at the system input is used with 12 iterative phase recovery methods in the same way as in G2.

The common theme in all these algorithms is to achieve best phase recovery by using prior information and constraints. Use of input masks leads to such prior information. Nonnegativity, support information, and amplitude information are also commonly used as prior information. Support information is especially important. This often means the (complex) image of size N×N is at the center of a window surrounded by zeros to make the total size 2N×2N. This is also important when using the fast Fourier transform (FFT) to approximate the continuous Fourier transform in digital implementations.

Experimental work indicates that there is usually not enough prior information with a single measurement of amplitudes in the Fourier domain for perfect phase and image recovery. In other words, the recovery results with given data may be better with some methods than others, but the recovery is usually not perfect, namely it is often approximate without additional information. Works involving multiple measurements by using input masks outlined above make up for this deficiency.

Recently, machine learning, and especially deep learning methods have been utilized, often for improving the results obtained with previous phase recovery methods. For example, two deep neural networks (DNNs) have been used together with the HIO method to improve the phase recovery results [Ç. Işll, F. S. Oktem, and A. Koç, 'Deep iterative reconstruction for phase retrieval,' *Applied Optics*, Vol. 58, pp. 5422-5431, 2019].

First, a DNN is used iteratively with the HIO method to improve the reconstructions. Next, a second DNN is trained to remove the remaining artifacts.

There is a growing realization in the research community that multiple measurements are necessary if high quality phase and image recovery are required. Quite recently, a number of such methods have been published in the literature. Below a discussion is presented on some methods having multiple measurements with some similarity to Gerchberg's G2 method.

In the phaselift method by Candes et al. [E. J. Candes, Y. Eldar, T. Strohmer, V, Voroninski, 'Phase Retrieval via Matrix Completion,' preprint, August 2011; E. J. Candes, X. Li, M. Soltanolkotabi, 'Phase Retrieval from Coded Diffraction Patterns,' Stanford University, Technical Report No. 2013-12, December 2013] the initial approach is the same as in Gerchberg's G2 method. In other words, a number of measurements are taken by using a number of masks. They also mention the use of optical grating, ptychography and oblique illuminations as substitutes for masks. However, masks are the major mechanism used in their papers. The averaging step in G2 is replaced by a convex optimization method, which is also related to the matrix completion or matrix recovery problems.

In the Fourier-weighted projections method by Sicairos and Fienup [M. Guizar-Sicairos, J. R. Fienup, 'Phase Retrieval with Fourier-Weighted Projections,' *J. Optical Soc. Am. A*, Vol. 25, No. 3, pp. 701-709, March 2008], masks are also used to achieve high quality phase recovery. They propose different types of masks for this purpose.

Ptychography is another method which utilizes multiple diffraction intensity measurements [J. M. Rodenburg, 'Ptychography and Related Imaging Methods,' *Advances in Imaging and Electron Physics*, Vol. 150, pp. 87-184, 2008]. It was first introduced by Hoppe in the time period 1968-1973, especially for X-ray imaging. Ptychography relies on recording at least 2 diffraction intensities by shifting the illumination function or the aperture function with respect to the object to be imaged by a known amount instead of relying on masks. Thus, there is a moving probe which illuminates the object at a time. When there is sufficient amount of overlap between the different parts of illumination, phase recovery can be achieved by an iterative phase retrieval algorithm. Another related algorithm has recently been developed by Sicairos and Fienup based on diverse far field intensity measurements taken after translating the object relative to the known illumination pattern [M. Guizar-Sicairos, J. R. Fienup, 'Phase Retrieval with Transverse Translation Diversity: A Nonlinear Optimization Approach,' *Optics Express*, Vol. 16, No. 10, pp. 7264-7278, 12 May 2008]. In this work, nonlinear optimization is used.

In summary, multiple diffraction intensity measurements are currently in use in the research community to solve phase and image recovery problems, for example, leading to diffractive (lensless) imaging [B. Abbey et al, 'Lensless Imaging Using Broadband X-Ray Sources,' *Nature Photonics*, pp. 420-424, 26 Jun. 2011]. This is especially important in areas such as X-ray and far infrared imaging in which lenses are very expensive.

SUMMARY OF THE EMBODIMENTS

Embodiments of the present invention improve upon prior art methods by using a minimal number of masks specially selected for excellent spectral phase and thereby complete information recovery. Consequently, the speed of computation is also increased. According to one method for recovering phase information from an array of points (for example, pixels) each having an amplitude, at least one transformation unit having an input and a spectral output is provided. The array of points may arrive optically in a coherent wave or electronically as data. The array may be one dimensional or higher dimensional, with two dimensional applications being more common. Amplitude information is recorded at the spectral points. The transformation unit may be a lens system with one or more lenses, or free space wave propagation, or a digital processing unit.

Acting upon the input to the transformation unit are at least two specially selected masks. There are two masking versions. In the first version, one of the masks is a unity mask (also referred to as a transparent mask with all its elements equal to 1). In the second version, there is at least one pair of complementary unipolar masks with their elements equal to 0 or 1 in amplitude. The input is applied separately to each of the at least two masks to generate a modified input from each of the masks. In accordance with an optical embodiment or the like, the masks are physical spatial masks. In such an embodiment, the input is a wave. The mask operating on the wave can be switched from one of the masks to another such that the input is individually received separately in sequence by each of the at least two physical spatial masks. Such switching can be accomplished in real time by optical devices such as a spatial light modulator or micromirror array, for example. Alternatively, the input wave could be split so that it is individually received in parallel by each of the physical spatial masks.

In any of the embodiments, it can be advantageous to include an outer border surrounding each mask that sets amplitudes of any points that coincide with the border to zero.

In accordance with embodiments of the invention, the number of masks required can be reduced to two or three. In one embodiment, the masks consist of the unity mask and a phase mask (FIG. 1C-I). In particular, the phase may involve quantized phase values. Thus, in a particular embodiment the phase mask is a bipolar (meaning 1 and −1) binary mask corresponding to phase values equal to 0 or $\pi$ (FIG. 1C-II). In a further embodiment, the masks consist of the unity mask and at least one pair of complementary unipolar binary masks (with one mask having elements 1 and 0, and the other one having 1's and 0's switched) (FIG. 1C-III) Moreover, the masks may consist of the unity mask and a pair of masks that are complementary with respect to amplitude equal to 1.

Efficient selection of masks can also be achieved in embodiments that do not include use of a unity mask. In accordance with this still further embodiment, there are four masks including two pairs of masks (FIG. 2). In each pair, the masks are complementary with each other with respect to amplitude. Thus, unity elements on such a mask may further include a phase factor in which the phase may involve continuous values between 0 and $2\pi$, or quantized phase values. In a more particular embodiment, the masks consist of two pairs of complementary unipolar binary masks.

A generalized Fourier transform (FT) as that term is used herein encompasses a transform performed physically or digitally. A generalized FT is performed by the transformation unit on the modified inputs received from each mask to produce transformed modified inputs. The spectral plane (output) is defined as the output (plane) of the generalized FT. The generalized FT naturally occurs due to coherent wave propagation and/or when the modified inputs pass through a lens system. It involves additional phase factors. A prominent example is Fresnel diffraction in coherent optics.

For a transformation unit that is a digital processing unit, the generalized FT may be a generalized fast Fourier transform (FFT). At the spectral output of the transformation unit, amplitude values are recorded at an array of points to produce a phasorgram from each of the transformed modified inputs. In optical embodiments, the recording can be done by an intensity sensor, such as a camera at the spectral plane (output) of the lens system. The resulting amplitude information on the spectral output is called a phasorgram.

The method further includes associating a phase value with each point on each phasorgram to form a plurality of complex phasorgrams. The phase value may initially be a random phase value in any of the embodiments. The complex phasorgrams are fed into an iterative process that runs until convergence is achieved to produce a totagram constituting a reconstructed input with amplitude and phase information. The totagram includes complete and valuable information that can be used in any number of ways. For example in any of the embodiments, the totagram can be used to display a representation of the reconstructed input with amplitude and phase.

In accordance with an embodiment for performing the iterative processing, the plurality of complex phasorgrams are processed by an inverse generalized Fourier transform and possibly other optimization steps. A single estimate of the input is obtained by averaging the complex information at each input point. The single estimate of the input is passed through a process replicating each of the masks to obtain a plurality of intermediate arrays of points. A generalized fast Fourier transform is performed on each of the intermediate arrays, and then the amplitude values at each point in the transformed intermediate arrays are replaced with the corresponding initially recorded amplitude values to generate another plurality of complex phasorgrams. There may be additional optimization steps here. The iterative process is repeated with the generated complex phasorgrams until convergence is achieved, wherein upon completion the single estimate of the input is the totagram.

In any of the embodiments, any number of methods can be used to determine convergence. A simple method is to count up to a given number of iterations. Alternatively, convergence is achieved when an absolute difference between successive single estimates reaches a predetermined threshold.

In any of the optical embodiments, the at least one transformation unit includes a lowpass filter that has a numerical aperture (NA) that is equal to or greater than 0.7.

Any embodiment may generate superresolved amplitude and phase information of the input wavefront by either applying linear phase modulation to the input wave prior to passing the input wave through each of the at least two physical spatial masks or by moving the intensity sensor spatially.

Any embodiment may include performing a preceding generalized Fourier transform (FT) on the input prior to separately applying the input to each of the at least two masks, for example, for lensless imaging of distant objects.

In any embodiment, the at least two physical spatial masks may have elements, each with an aperture size of one of (i) 8×8 pixels or less, or (ii) 16×16 pixels or less for easier implementation. Each element of a mask has an associated constant amplitude and/or phase that is applied to each of the pixels or points passed through that element of the mask.

A system embodiment of the invention operates in accordance with one or more of the method embodiments. The system includes a transformation unit, which may be a lens system with one or more lenses or may be a digital processing unit. The system further includes at least two masks. In accordance with some embodiments, the at least two masks include a unity mask. In one embodiment, the masks consist of the unity mask and a phase mask (FIG. 1C-I). The phase mask may have quantized phase values. In particular, the masks may consist of the unity mask and a bipolar binary mask (FIG. 1C-II). In a further embodiment, the masks consist of the unity mask and a pair of complementary unipolar binary masks (FIG. 1C-III). More generally speaking, the masks may consist of the unity mask and one pair of masks or more than one pair of masks that are complementary with respect to binary amplitude.

In accordance with still further embodiments, the masks may consist of one pair or more than one pair of masks that are complementary with respect to amplitude without a unity mask. In particular, there may be four masks including two pairs of masks, wherein the masks in each pair are complementary with each other with respect to amplitude. This means the values 1 and 0 in one mask become 0 and 1, respectively, in the second mask (FIG. 2). Unity points on such a mask may further include a phase factor. In a more particular embodiment, the masks consist of two pairs of complementary unipolar binary masks.

In any of the embodiments, it can be advantageous to include an outer border surrounding each mask that sets amplitudes of any points that coincide with the border to zero. Indeed, according to a still further embodiment, the masks consist of one pair of complementary unipolar binary masks each with an outer border that sets amplitudes of any points that coincide with the border to zero.

In optical embodiments, the masks are physical spatial masks disposed at the input plane of the optical lens system. The masks operating on the wave can be switched from one of the masks to another such that the input is individually received separately in sequence by each of the at least two physical spatial masks. Such switching can be accomplished in real time by optical devices such as a spatial light modulator or micromirror array, for example. Alternatively, the input wave can be split by a beam splitter so that it is individually received in parallel by each of the physical spatial masks.

An input separately modified by each of the masks is passed through the transformation unit. The amplitude values at an array of points of the transformed modified inputs are recorded to produce phasorgrams. In the optical embodiments, recording of amplitude values is performed by at least one sensor system. The sensor system may be an intensity sensor, such as a camera.

The system further includes a processor configured to (1) associate an initial phase value with each point on each phasorgram to form a plurality of complex phasorgrams; and (2) iteratively process the plurality of complex phasorgrams until convergence is achieved to produce a totagram constituting a reconstructed input with amplitude and phase information.

BRIEF DESCRIPTION OF THE DRAWINGS

The foregoing features of embodiments will be more readily understood by reference to the following detailed description, taken with reference to the accompanying drawings, in which:

FIG. 1B-I is a schematic view of an embodiment of another system, in accordance with the present invention.

FIG. 1B-II is a schematic view of an embodiment of another system, in accordance with the present invention.

FIG. 1C-I is a schematic view of an embodiment of a system having a unity mask and a phase mask, in accordance with the present invention.

FIGS. 1C-II is a schematic view of an embodiment of a system having a unity mask and a bipolar binary mask, in accordance with the present invention.

FIGS. 1C-III is a schematic view of an embodiment of a system having a unity mask and a pair of unipolar masks, in accordance with the present invention.

DETAILED DESCRIPTION OF SPECIFIC EMBODIMENTS

Definitions. As used in this description and the accompanying claims, the following terms shall have the meanings indicated, unless the context otherwise requires:

The term "totagram" is defined herein as the resulting input phase and amplitude information from the iterative spectral phase recovery process using masks. The information can be one dimensional or multi-dimensional. In particular embodiments, the totagram is the reconstructed amplitude and phase of an input coherent wave at a particular wavelength.

The term "totagraphy" or the "totagraphic method" herein is defined herein as the process of obtaining totagrams.

"Totagraphic imaging" involves recording of spectral amplitude by a sensor/camera on the spectral plane in contrast to other imaging systems where recording of image information is done by a camera on the image plane.

"Holography" involves a physical recording of an interference pattern due to mixing of an object wave and a reference wave creating a hologram. On the other hand, totagraphy replaces the recording of an interference pattern between an object wave and a reference wave, as in holography, but instead performs several measurements using special masks which are iteratively processed to create a totagram, using the methods and systems defined herein.

A "phasorgram" is defined herein as information that includes the measured or recorded spectral amplitude information after processing an input wave by the transformation unit (e.g., a generalized Fourier transform) with respect to a particular input mask. Phasorgrams have little or no resemblance to the input wave because the spectral phase information is discarded and spectral amplitude is recorded.

INTRODUCTION

Figure 1A:
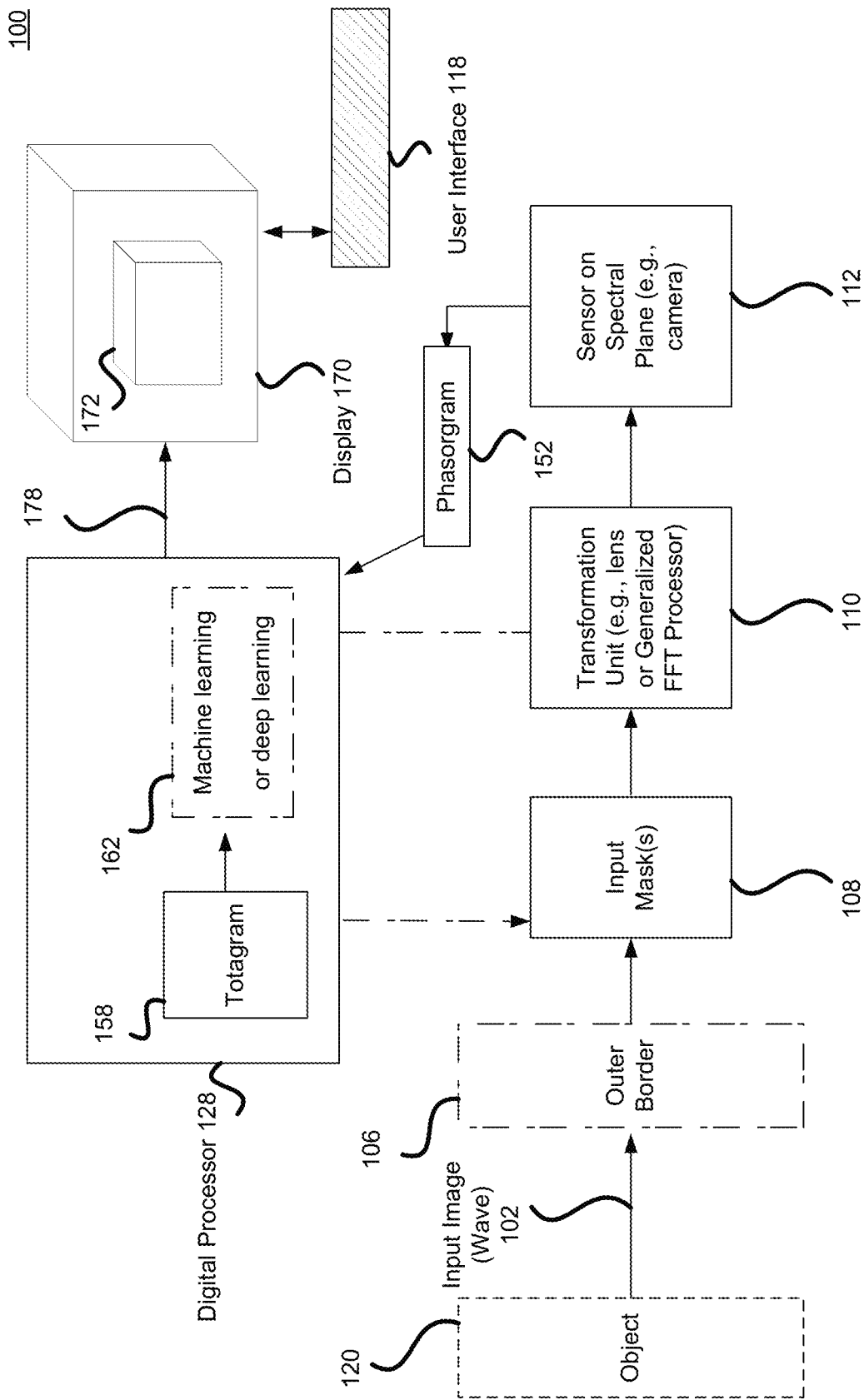
FIG. 1A is a schematic view of an embodiment of a system, in accordance with the present invention.

FIG. 1A is a schematic view of an embodiment of a system 100 for use with the present invention. The system 100 recovers phase and amplitude information from a coherent input wave 102. The input wave 102 may be generated from an object 120. The object 120 may be an illuminated object. The system 100 includes at least one transformation unit 110 having a spectral plane (SP) and input plane (IP) and at least two masks 108. The system is configured so that the input wave 102 is separately applied in series to each of the masks. In optical embodiments, the masks are physical spatial masks. Such physical masks may be implemented to change in real time from one mask to another by optical devices such as a spatial light modulator or a micromirror array. The at least two physical spatial masks may be located at the IP of the at least one transformation unit 110. In some embodiments, the transformation unit may be a lens system having one or more lenses. In any of the optical embodiments, the at least one transformation unit may also function as a lowpass filter that has a numerical aperture (NA) that is equal to or greater than 0.7. In other embodiments, the transformation unit may be implemented in a digital processor.

Each of the at least two masks may include an input window 106 formed of a respective opaque border surrounding the mask. Each opaque border is configured to block pixels in the input wave coinciding with the border thereby setting amplitudes of those pixels to zero. The at least two masks 108 are configured to modify phase or amplitude of its separately received input wave. The at least one transformation unit is configured to perform a generalized Fourier transform (FT) on the modified separately received input wave.

The system 100 further includes at least one sensor 112 configured to record amplitude values at an array of points of each transformed modified input at the SP. The at least one sensor generates a phasorgram 152 that includes the measured or recorded spectral amplitude information. Phasorgrams 152 may have little or no resemblance to the input wave 102 because the phase information is discarded. The sensor 112 may be a camera, which is an intensity sensor. The amplitude values are directly derived from intensity. Intensity is understood to be linearly proportional to the square of amplitude.

The system 100 further includes a digital processor 128. Phasorgrams 152 are iteratively processed by the processor 128 to generate a totagram 158. The processor 128 is configured to: associate a phase value with each point on each phasorgram to form a plurality of complex phasorgrams; and iteratively process the plurality of complex phasorgrams until convergence is achieved to produce a totagram 158 constituting a reconstructed input wave with amplitude and phase information. The spectral phase is recovered to go along with the recorded amplitude values. The input amplitude and phase can be obtained from the spectral phase and amplitude through using a generalized IFFT, if desired. The processor 128 may provide the totagram 158 for further processing 162. The computer processing 162 may include image processing, machine learning and/or deep learning. The processed result 178 may form an image 172 in a display 170 that is accessible by a user interface 118.

FIG. 1B-I and FIG. 1B-II are schematic views of systems 150A and 150B, respectively, in accordance with embodiments for separately applying the input in parallel to a plurality of physical spatial masks. The systems 150A and 150B each recover phase and amplitude information from an input wave 102. The input wave 102 may be generated from an object 120. The object 120 may be an illuminated object. The systems 150A and 150B each include at least two physical spatial masks 108 each disposed at the input plane of the corresponding transformation unit 110.

The systems 150A and 150B each further include a splitter 130A (also known as "beamsplitter" herein) configured to split the input wave 102 into two or more separate waves. Each of the separate waves from the splitter passes through a corresponding one of the at least two physical spatial masks 108 to produce a modified wave. The at least one transformation unit 110 is configured to perform a generalized Fourier transform (FT) on the modified input wave 102. The systems 150A and 150B include a sensor 112 configured to record spectral amplitude images of the transformed separate waves at the spectral plane for each transformation unit. The systems 150A and 150B include a processor 128 which operates as previously described with respect to FIG. 1A.

In addition, system 150B, as shown in FIG. 1B-II, may perform, via a transformation unit 107, a preceding generalized Fourier transform (FT) on the input wave 102, prior to passing the input wave 102 individually through the splitter 130A. In particular embodiments, the transformation unit 107 is a lens that receives the input wave enroute to the input masks 108. The preceding generalized Fourier transform of transformation unit 107 converts the initial input plane image (wave) to a second image (wave). On this plane, the input masks 108 are used with the second image with a generalized Fourier transform through transformation unit 110 as before for illuminating the intensity sensor 112.

The iterative phase recovery process includes only the second image (wave). Once the phase recovery is completed, the initial input plane image (wave) is recovered by a final inverse generalized Fourier transform.

In accordance with embodiments of the present invention, each of FIGS. 1C-I, 1C-II, 1C-III, and 2 illustrate minimal sets of masks that achieve complete phase recovery more quickly and efficiently than systems with many more masks. FIGS. 1C-I, 1C-I and 1C-III make advantageous use of a unity mask 108t, which can also be referred to as a transparent mask. The input wave passes through the unity mask undisturbed, thus physically the unity mask may be achieved by any unobstructed light path. Optionally, to further improve on the efficiency of the computational process an opaque outer border may surround the unity mask as shown in the figures. The border sets amplitude of points on the wave coinciding with the outer border to zero. While multiple masks can be added to a system, according to these embodiments of the invention, inclusion of a unity mask can achieve the desired totagram with as few as one or two additional masks. If more masks are used, the final information recovery is of higher quality when one of the masks is a unity mask.

FIG. 1C-I is a schematic view of an embodiment of a system having a unity mask 108t and a phase mask 108c. A phase mask 108c imparts a phase shift on points passing through the mask. Each pixel or element (group of pixels) of the mask may impart its own designated phase shift which may vary from element to element. In a two-dimensional mask, an element is typically a square of pixels having an aperture size measured by the number of pixels on a side. A phase mask may be advantageously simplified by involving quantized phase values. For example, with 2-level quantization, the quantized phase values are 0 and $\pi$, resulting in phase factors equal to 1 or −1. Such a phase mask is called a bipolar binary mask.

As shown in FIG. 1C-II, a unity mask 108t and a bipolar binary mask 108b can be the only two masks, in accordance with an embodiment of the present invention. Even these two simple masks efficiently produce a totagram. The unity mask is essentially all 1's and the bipolar binary mask is a "checkerboard" of randomly distributed 1's and −1's. Opaque outer borders can surround the masks for further improving efficiency.

FIG. 1C-III is an embodiment of the present invention that takes advantage of unipolar binary masks 108u. The pixels or elements of a unipolar binary mask are either open (an amplitude of 1 meaning pass) or closed (an amplitude of 0 meaning no pass). The pixels or elements are arranged in a random pattern. The unipolar binary masks are used in a pair in which the masks are complementary with each other with respect to amplitude. This means for an element location in one mask having an amplitude of 1, the corresponding element in the other mask has an amplitude of 0. A minimal mask configuration for efficiently generating totagrams includes a unity mask 108t and a complementary pair of unipolar binary masks 108u.

Figure 2:
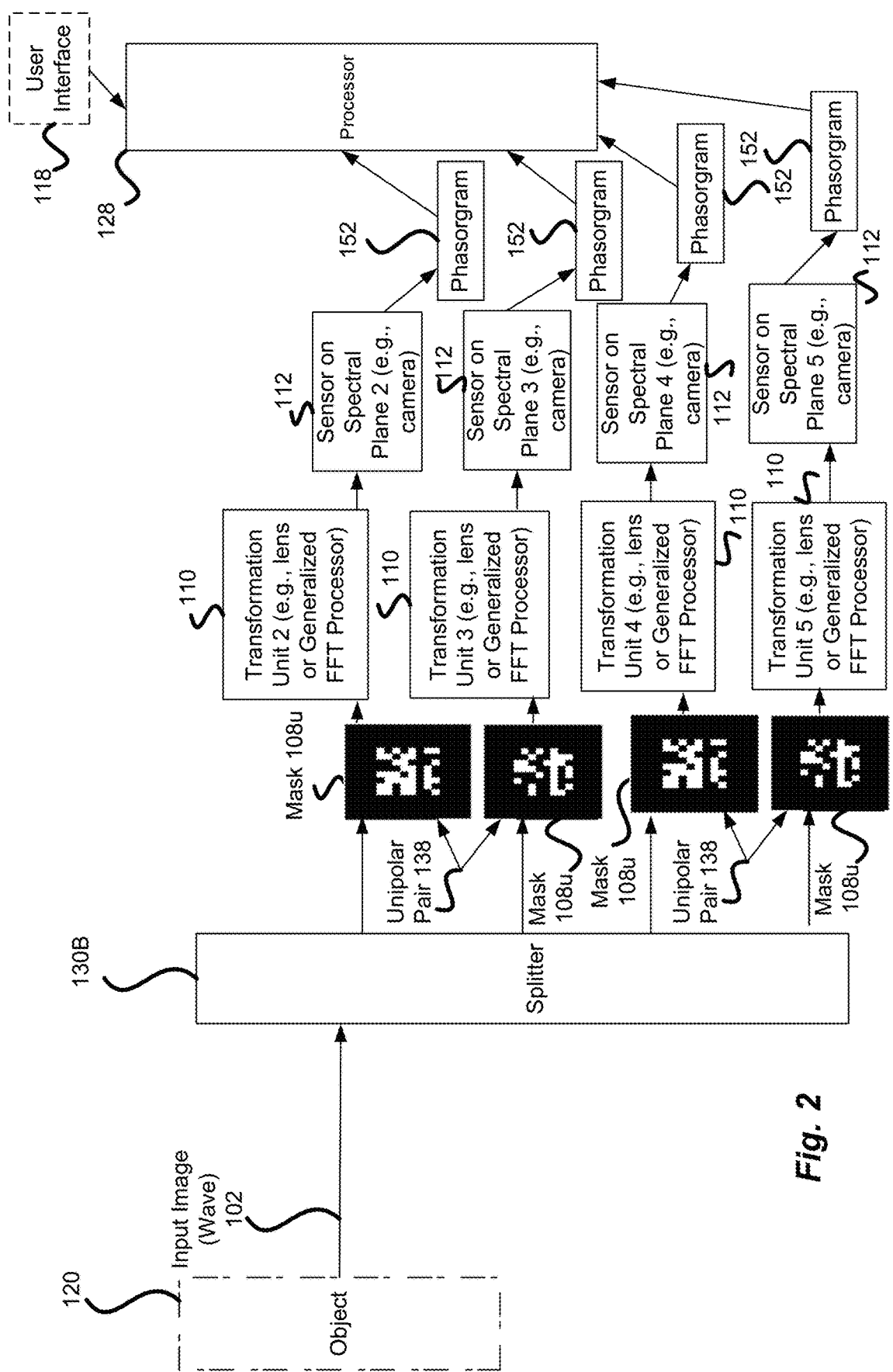
FIG. 2 is a schematic view of an embodiment of a system having two pairs of unipolar masks, in accordance with the present invention.

FIG. 2 is a schematic view of an alternative embodiment of the present invention that uses two pairs of complementary binary masks 108v, wherein a unity mask is not necessary. In accordance with this embodiment a totagram can be determined using at least four masks. The four masks include two pairs of masks, wherein the masks in a pair are complementary with each other with respect to amplitude. In particular, the four masks may all be unipolar binary masks. While the amplitudes of the mask elements are 1's or 0's, it is also possible to include random phase factors in the 1 elements making the masks complex.

In a still further embodiment of the present invention, the masks 108v can be reduced to only one pair of complementary binary masks. Such a configuration of masks may have difficulty producing a totagram when the input has a full range of phase variation from 0 to $2\pi$. But for inputs limited in phase in a narrower range such as between 0 and $\pi$, one pair of complementary masks can be sufficient. Again, the masks in a pair are complementary with each other with respect to amplitude. In particular, both masks may be unipolar binary masks. This case would be further improved if opaque borders surround the masks. Thus, for certain applications, this single pair of complementary binary masks may be used instead of two pairs.

Figure 3A:
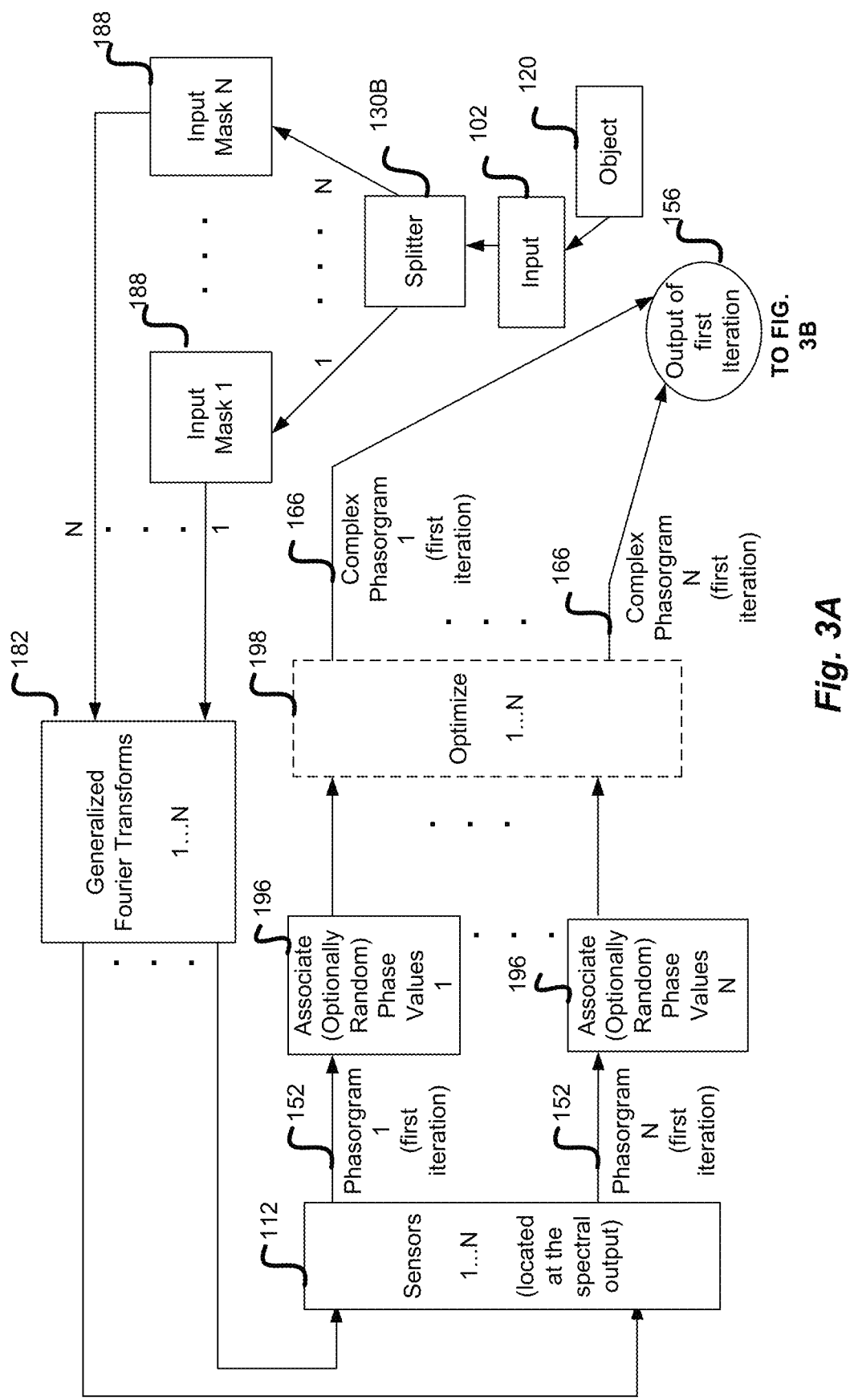
FIGS. 3A and 3B is a flow diagram of a method of phase recovery, in accordance with embodiments of the present invention.

The phase recovery system for use with the masks of embodiments of the present invention shall now be described in greater detail with respect to FIGS. 3A and 3B. The input 102 to the system is an array of points, each point having an amplitude. The array may be one dimensional or higher. In an optical environment, the input is a coherent wave captured as a two-dimensional array of pixels (points). The system may receive its input via an input image (wave) from an object 120. The object 120 may be an illuminated object. To recover full color wave information, several phase recovery systems can be configured to run in parallel. For example, each system can operate on its own coherent wave for one of the three primary colors (wavelengths). This can be generalized to multispectral and hyperspectral images (waves) with more than 3 wavelengths.

The input needs to be separately presented to each of the masks. This is easily performed in a digital embodiment processing the input array separately through each of a plurality of masks. In an optical embodiment, a splitter 130B can be used to replicate the input point array for each of the masks. Alternatively, the input masks can be switched out in series by a spatial light modulator or micromirror array as described with respect to FIG. 1A.

The system is configured with a plurality of masks 188 according to any of the embodiments described above with respect to FIGS. 1C-I, 1C-II, 1C-III and 2. Additional masks can also be used, but it is advantageous to minimize the number of masks and hence the amount of computations and ease of implementation. Optionally, outer borders surrounding the masks can be used to further facilitate efficiency and accuracy of the iterative computational process. The input modified by each mask is passed through a transformation unit 110 to perform a generalized Fourier transform 182. In optical embodiments, the transformation unit can be a lens or a system of lenses. In digital embodiments, the generalized Fourier transform 182 is computed. The generalized Fourier transform may be a generalized FFT.

The transformed modified inputs are each fed to a sensor 112 for recording amplitude values at the spectral array of points of each transformed modified input. The array of amplitude values is referred to as a phasorgram. The sensor 112 is insensitive to phase. Thus, any phase aberrations which can be modeled as phase variations on the spectral plane (output) are removed at the sensor. In optical embodiments, the sensor 112 may be an intensity sensor, such as a camera. Intensity is linearly proportional to the square of amplitude.

The method further includes, in the digital processor 128, associating a phase value 196 with each point on each phasorgram to form a plurality of complex phasorgrams. In preferred embodiments, a randomly selected phase value is associated with each point. Inclusion of phase leads to a complex phasorgram.

The complex phasorgrams enter an iterative process. A number of approaches are known in the art. One such process is G2. Other approaches are demonstrated in Phasepack, for example. Depending on the process being implemented in the system, the complex phasorgrams may each optionally go through an optimization process 198 (which can be at the input and/or the output of the iterative system). Then, each complex phasorgram is processed through an inverse generalized Fourier transform 186. For an FFT, the inverse is an IFFT and vice versa.

The outputs of the inverse generalized Fourier transform is optionally optimized depending on the process implemented and then the complex information at each corresponding point is averaged 178 to produce a single estimate of the input. Another optimization process may be optionally included at the output side of the iterative process. Each time a single estimate is obtained, the process determines whether convergence has occurred 172. According to one convergence test, the processing continues until a difference between successive single estimates reaches a predetermined threshold. According to another approach, convergence is assumed to have been reached after a given number of iterations of determining a single estimate have been completed. According to some embodiments, the predetermined threshold is reached when the Fractional Error, that is the Sum of the Squared Error (SSE) over all N images output from the inverse generalized Fourier transforms divided by the amplitudes squared over all N images (the total energy) between two successive iterations, is less than a value, such as, but not limited to 0.0001. The SSE represents a difference squared between the N current waveforms and the last estimate. Alternatively, the SSE can be defined in terms of the current estimate after averaging and the last estimate. Once convergence has been achieved, the final estimate of the input amplitude and phase constitutes the totagram.

Figure 3B:
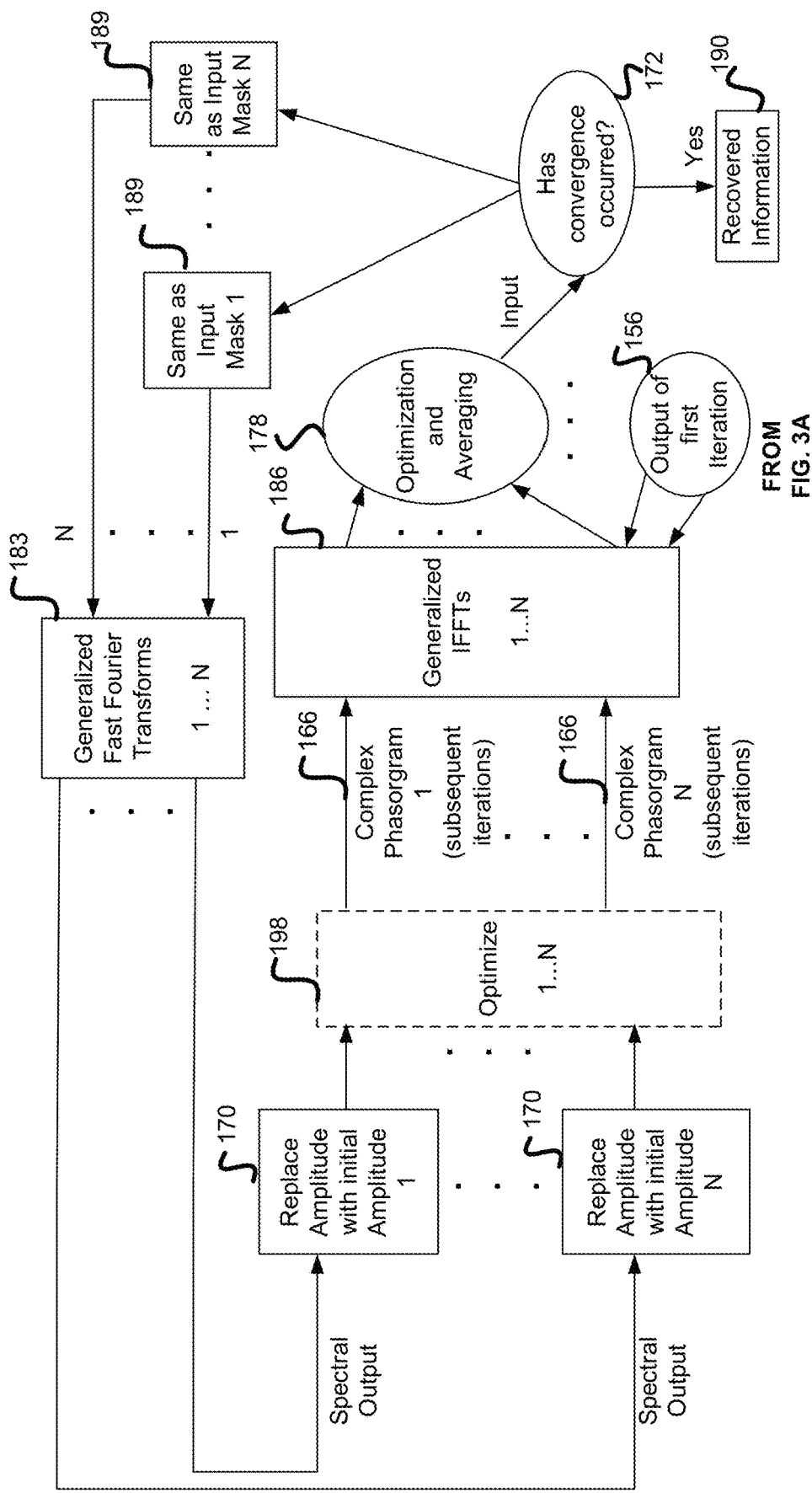

The iterative process is further illustrated in FIG. 3B. The single estimate is passed through a process 189 replicating each of the input masks to obtain a plurality of intermediate arrays, one from each mask. In other words, the phase shift and/or amplitude factor for each element in the corresponding mask then modifies the input to yield the intermediate arrays. A generalized fast Fourier transform 183 is performed on each of the intermediate arrays. At each point in the transformed intermediate array, the amplitude value is replaced 170 by the corresponding amplitude value initially recorded by the sensors 112, thereby generating another iteration of complex phasorgrams. The complex phasorgrams are optimized, if applicable to the iterative process being implemented. Then, as in the first iteration, each complex phasorgram is processed through an inverse generalized Fourier transform 186. For an FFT, the inverse is an IFFT and vice versa. The outputs of the inverse generalized Fourier transform is optionally optimized depending on the process implemented and then the complex information at each corresponding point is averaged 178 to produce a single estimate of the input. The process continues iteratively until convergence has occurred 172.

Optionally, the phase recovery method may generate superresolved amplitude and phase information from the input wave by performing linear phase modulation on the input wave a number of times prior to passing the input wave through each of at least two physical spatial masks or moving the intensity sensor spatially after passing the input wave through each of the at least two physical spatial masks a number of times. This can also be achieved by moving the location of the spectral output a number of times.

In any embodiment of the at least two masks, each element of a nonunity mask may have an aperture size of 8×8 pixels or less. In any embodiment consisting of at least two masks, a nonunity mask may have an aperture size of 16×16 pixels or less. Each element of a nonunity mask has an associated constant amplitude and/or phase that is applied to each of the pixels or points passed through that element of the mask.

Any embodiment may include processing the totagram to provide a solution to a task. These tasks may include microscopy, encoding, signal processing, wavefront sensing, and/or light computing. The information within a totagram can be converted into a hologram by using recovered amplitude and phase information. The result is known as a digital hologram or computer-generated hologram. The 3-D information of a totagram can also be visualized in other ways by digital techniques such as by computer graphics, volumetric displays, virtual reality, augmented reality, or mixed reality. Any embodiment may include displaying a result or representation of the solution on a display.

The efficacy of the system and methods of the present invention has been shown for a wide variety of inputs. If the input has zero phase, this means the input has only amplitude variations. This is the simplest case. The most general case has the input phase varying between 0 and $2\pi$ radians.

There are two major categories of suitable mask combinations according to the embodiments of the present invention. In the first category, the first mask is a unity (clear, transparent, with all elements equal to +1) mask. The second mask can be (1) a phase mask with phase changing between 0 and $2\pi$ radians, (2) a quantized phase mask with elements equal to quantized phase values, (3) a bipolar binary mask with elements equal to +1 and −1, corresponding to quantized phases chosen as 0 and pi radians, (4) a pair of complementary masks, meaning one mask has elements 0 and $\exp(j\theta_1)$, $\theta_1$ being a quantized or continuous phase, and the second mask having corresponding elements equal to $\exp(j\theta_2)$, $\theta_2$ being a quantized or continuous phase, and 0, respectively. In other words, the masks are complementary with respect to amplitude. If an element of one mask has the value 0, the corresponding element in the other mask of the pair has amplitude of 1 and the associated phase factor. In a specific case, when $\theta_1$ and $\theta_2$ are chosen equal to 0, the masks become a complementary pair of unipolar binary masks with elements equal to 0 and 1. In another specific case, when $\theta_1$ and $\theta_2$ are limited to either 0 or $\pi$, the masks become a complementary pair of binary masks with elements equal to 0 and ±1. Binary refers to the two amplitude values, either 0 or 1.

In the second category, the transparent mask is not required, rather, there are pairs of complementary masks, preferably two or more pairs. In particular, two pairs of complementary unipolar (+1 and 0) binary masks can be effectively used. If more masks are used, the number of phase recovery iterations are usually reduced.

In all cases discussed in categories 1 and 2, it is possible to use outer borders filled with zeros. Use of borders, for example, by doubling the mask size and filling the outer border of the mask with zeros usually gives more accurate reconstruction results or reduced number of phase recovery iterations.

COHERENT PHASE/AMPLITUDE RECOVERY WITH G2

A major application of coherent phase/amplitude recovery is imaging which can be 2-D, 3-D or higher dimensional. In order to achieve multidimensional imaging, it is necessary to have complete wave information consisting of amplitude and phase. Below G2 is discussed as an example of a number of candidate methods for coherent phase/amplitude recovery.

Assuming a constant z (the longitudinal direction), the coherent spatial wave can be written as $$u(x,y)=A(x,y)e^{j\alpha(x,y)} \tag{1}$$

where $A(x,y)$ is the input spatial amplitude and $\alpha(x,y)$ is the input spatial phase at (x, y, z).

At this point, we will assume that the wave is generalized Fourier transformed. In a digital implementation, this means the wave is processed by generalized FFT. In an optical implementation, the wave goes through a lens system with focal length F. Then, the initial wave is assumed to be at $z=-F$. The spectral plane is at $z=F$. It is known that on the spectral plane, the wave is proportional to the Fourier transform of the input wave [O. K. Ersoy, *Diffraction, Fourier Optics and Imaging*, J. Wiley, November 2006, incorporated by reference in its entirety herein]. This is the case discussed below.

On the spectral plane, the corresponding wave can be written as $$U(f_x,f_y)=B(f_x,f_y)e^{j\theta(f_x,f_y)} \tag{2}$$

where $B(f_x,f_y)$ is the spectral amplitude, and $\theta(f_x,f_y)$ is the spectral phase. $(f_x,f_y)$ corresponds to the spatial frequencies. With the lens system, they are given by $$f_x=x_f/\lambda F \tag{3}$$

$$f_y=y_f/\lambda F \tag{4}$$

where $\lambda$ is the wavelength, and $(x_f,y_f)$ are the spatial coordinates on the spectral plane.

Assuming the sensor is located on the spectral plane, or on purpose, the spectral phase is lost, and the spectral amplitude is obtained via spectral intensity $I(f_x,f_y)$ as $$I(f_x,f_y)=|B(f_x,f_y)|^2 \tag{5}$$

In subsequent iterations with a computer, $I(f_x,f_y)$ is processed further by fast Fourier transform (FFT) techniques.

Below the details of digital processing with the discrete Fourier transform (DFT) and its inverse (IDFT), their fast algorithms fast Fourier transform (FFT) and inverse fast Fourier transform (IFFT) are further described. The following will be defined:

S: input signal $P_i$: input mask, i=1, 2 . . . , M

M: number of masks

FT: Fourier transform (DFT in numerical work)

IFT: Inverse Fourier transform (IDFT in numerical work)

$\theta_i$=output phase, i=1, 2 . . . , M $\theta_i$ is chosen randomly in the range [0, $2\pi$] in the first iteration during phase recovery.

The initial transformations in the first iteration between the input space and the output space are as follows:

$$S_i=P_i \cdot S, \; i=1, 2 \ldots, M \tag{6}$$

$$A_i=|\text{FT}(S_i)|, \; i=1, 2 \ldots, M \tag{7}$$

$$U_i=\text{IFT}(A_i \cdot e^{j\theta_i}), \; i=1, 2 \ldots, M \tag{8}$$

$$V_i=U_i/P_i, \; i=1, 2 \ldots, M \tag{9}$$

where the operations · and / denote pointwise multiplications and divisions, respectively: The next iteration is started after averaging $V_i$'s as follows:

$$S = \frac{1}{M}\sum_{i=1}^{M} V_i \tag{10}$$

Then, equations (6-10) during the current iteration are repeated. The iterations are stopped either by checking whether $A_i \cdot e^{j\theta_i}$ is changing negligibly or if a specified maximum number of iterations are completed.

The DFT and inverse DFT in the 1-D case are given by $$S_2^i(k) = \sum_{n=0}^{N-1} S_1^i(n) e^{-j2\pi nk/N} \quad n, k = 0, 1, 2, \ldots, (N-1) \tag{11}$$

$$S_i(k) = \frac{1}{N} \sum_{n=0}^{N-1} S_3^i(n) e^{j2\pi nk/N} \quad n, k = 0, 1, 2, \ldots, (N-1) \tag{12}$$

Equations (11) and (12) can be easily extended to the 2-D case.

DESIGN FOR DIGITAL/OPTICAL IMPLEMENTATION

Digital implementation of iterative phase recovery methods can be done in a computer system.

Digital/optical implementation of the iterative phase recovery methods can also be done by fabrication of an optical system to be coupled with a digital system fed by the output of the digital sensor/camera for subsequent iterative processing.

For digital/optical implementation, spectral imaging with a high resolution camera and real time electronic phase/amplitude masks such as spatial light modulators are used. Subsequent digital processing is done by a computer system with high precision. FFT techniques require their own sampling intervals. These should be matched to the pixel intervals with the camera.

Once amplitude and phase recovery is completed in the optical/digital system, the information is called a totagram.

Any embodiment may include processing the totagram to provide a solution to a task. These tasks may include microscopy, encoding, signal processing, wavefront sensing, and/or light computing. The information within a totagram can be converted into a hologram by using recovered amplitude and phase information. The result is known as a digital hologram or computer-generated hologram. The 3-D information of a totagram can be visualized in other ways by digital techniques such as by computer graphics, volumetric displays, virtual reality, augmented reality, or mixed reality.

The experimental results in an optical/digital system may not be as perfect as the purely digital implementation results. In order to compensate for the differences, machine learning (ML) and deep learning (DL) techniques can be used to improve the results. Such techniques have recently been reported for aiding phase recovery and diffractive imaging [Y. Rivenson, Y. Zhang, H. Günaydin, Da Teng and A. Ozcan, 'Phase Recovery and Holographic Image Reconstruction Using Deep Learning in Neural Networks,' *Light: Science & Applications*, Vol. 7, 17141, 2018, incorporated by reference in its entirety herein]. G. Barbastatis, A. Ozcan, G. Situ, 'On the Use of Deep Learning for Computational Imaging,' *Optica*, Vol. 6, No. 8, pp. 921-943, August 2019, incorporated by reference in its entirety herein]. ML and DL utilize very large data bases of images. For example, the input image to the system can be what is achieved experimentally, and the output desired image is what it should ideally be. By training with a very large database of such images, ML and DL methods have been reported to achieve good results.

ITERATIVE PHASE RECOVERY METHODS WITH DIFFRACTION LIMITED OPTICAL COMPONENTS

The transformation unit 110 may be a coherent optical system that is at least diffraction-limited, and is governed by a point-spread function and its Fourier transform, the coherent transfer function (CTF). The system acts as an ideal lowpass filter with a cutoff frequency governed by the lens system numerical aperture NA. In this section, we show and claim that with sufficiently large NA (~0.7), iterative phase recovery is unhindered by diffraction.

A diffraction limited lens system acts as a linear system with a point spread function $h(x,y)$ and a coherent transfer function $H(f_x,f_y)$ which is the Fourier transform of $h(x,y)$. The linear system equation in the space domain is given by $$u_{output}(x,y) = h(x,y) * u_{input}(x,y) \tag{13}$$

where * denotes linear 2-D convolution, and $u_{output}(x,y)$ is the output spatial wave. The corresponding spectral equation by convolution theorem is given by $$U(f_x,f_y) = H(f_x,f_y) U(f_x,f_y) \tag{14}$$

where $U(f_x,f_y)$ is the Fourier transform of the output spatial wave.

A coherent wave illumination on a 3-D object will be assumed. This can be achieved with a laser or high quality light emitting diode (LED). For example, a He-Ne laser operates at wavelength $\lambda$ equal to 0.6386 micron ($\mu = 10^{-6}$ m), and a LED operates around $\lambda = 0.5\mu$.

Some quantities of interest are the following:

$k_0 = 2\pi/\lambda$, the wave number
NA = numerical aperture
sp = sampling pixel size of camera
fp = final pixel size of reconstruction Due to diffraction, the optical imaging system has a cutoff frequency given by $$f_c = NA \cdot k_0 \tag{15}$$

The sampling frequencies on the spectral plane will be written as $$kxs = kys = -k_{max}, -k_{max} + \Delta k, \ldots, +k_{max} \tag{16}$$

where, for $N_1$ sampling points along x and y directions, $\Delta k$ can be chosen as $$\Delta k = \frac{2k_{max}}{N_1 - 1} \tag{17}$$

Then, the coherent transfer function is given by $$H(f_x, f_y) = CTF(f_x, f_y) = \begin{cases} 1 & k_s < f_c \\ 0 & \text{otherwise} \end{cases} \tag{18}$$

where $$k_S = \sqrt{kxs^2 + kys^2} \tag{19}$$

for each component of kxs and kys.

The inventor has made experiments to discover which values of NA allows for a perfect reconstruction. It has been determined that with NA=0.7 or higher the reconstructed images are visually as good as the originals.

ABERRATIONS

Aberrations are departures of the ideal wave within the exit pupil of a lens system from its ideal form. In a coherent imaging system, this can be modeled as multiplying the optical transfer function by a phase factor. In this section, it is shown and claimed that phase aberrations have no detrimental effect on the performance of iterative phase recovery methods.

A diffraction-limited system means the wave of interest is perfect at the exit pupil, and the only imperfection is the finite aperture size. Aberrations are departures of the ideal wave within the exit pupil from its ideal form. In order to include phase aberrations, the exit pupil function can be modified as $$P_A(x,y) = P(x,y)e^{jk\phi_A(x,y)} \qquad (20)$$

where $P(x,y)$ is the exit pupil function without aberrations, and $\phi_A(x,y)$ is the phase error due to aberrations.

The phase function $\phi_A(x,y)$ is often written in terms of the polar coordinates as $\phi_A(r,\theta)$. What is referred to as Seidel abberations is the representation of $\phi_A(r,\theta)$ as a polynomial in r, for example, $$\phi_A(r,\theta) = a_{40}r^4 + a_{31}r^3 \cos\theta + a_{20}r^2 + a_{22}r^2 \cos^2\theta + a_{11}r\cos\theta \qquad (21)$$

Higher order terms can be added to this function. The terms on the right-hand side of Eq. (19) represent the following:

$\alpha_{40}r^4$: spherical aberration
$a_{31}r^3 \cos\theta$: coma
$a_{20}r^2$: astigmatism
$a_{22}r^2 \cos^2\theta$: field curvature
$a_{11}r \cos\theta$: distortion

Zernicke Polynomials

The phase aberrations present in an optical system can also be represented in terms of Zernicke polynomials, which are orthogonal and normalized within a circle of unit radius [V. N. Mahajan, "Zernike circle polynomials and optical aberrations of systems with circular pupils," *Engineering and Laboratory Notes*, R. R. Shannon, editor, supplement to *Applied Optics*, pp. 8121-8124, December 1994]. In this process, the phase function $\phi_A(x,y)$ is represented in terms of an expansion in Zernike polynomials $z_k(\rho,\theta)$, where $\rho$ is the radial coordinate within the unit circle, and $\theta$ is the polar angle.

Each Zernike polynomial is usually expressed in the form $$z_k(\rho,\theta) = R_n^m(\rho)\cos m\theta \qquad (22)$$

where n,m are nonnegative integers. $R_n^m(\rho)$ is a polynomial of degree n, and contains no power of n less than m. In addition, $R_n^m(\rho)$ is even (odd) when m is even (odd), respectively. The representation of $\phi_A(x,y) = \phi_A(\rho,\theta)$ can be written as $$\phi_A(\rho,\theta) = A_\infty + \frac{1}{\sqrt{2}}\sum_{n=2}^{\infty} A_{n0}R_n^0(\rho) + \sum_{n=1}^{\infty}\sum_{m=1}^{\infty} A_{nm}R_n^m(\rho)\cos m\theta \qquad (23)$$

The coefficients $A_{nm}$ are determined for finite values of n and m by least-squares. In turn, $\phi_A(\rho,\theta)$ can also be written as $$\phi_A(\rho,\theta) = \sum_{k=1}^{K} w_k z_k(\rho,\theta) \qquad (24)$$

where K is an integer such as 37. The coefficients $w_k$ are found by least-squares. Since each successive Zernike term is orthonormal with respect to every preceding term, each term contributes independently to the mean-square aberration. This means the root-mean square error $\overline{\phi_A}$ due to aberrations can be written as $$\overline{\phi_A} = \left[\sum_{k=1}^{K} w_k^2\right]^{\frac{1}{2}} \qquad (25)$$

Note that the Zernike representation of aberrations is valid when the exit pupil is circular. Otherwise, the Zernike polynomials are not orthogonal.

Coherent optical systems have aberrations. They are usually modeled as phase factors on the spectral plane of the system. For example, such modeling can be done in terms of polynomials expressing phase due to aberrations, such as Seidel aberrations and Zernicke polynomials. On the spectral plane, the intensity is measured, and all phase is lost. That includes the phase due to aberrations. The camera eliminates all phase, and consequently phase aberrations which can be represented as phase factors on the spectral plane have no detrimental effect on the performance of iterative phase recovery methods according to FIGS. 3A and 3B.

SUPERRESOLUTION WITH ITERATIVE PHASE RECOVERY METHODS

In the previous section, perfect phase reconstruction was achieved for applications such as 3-D imaging. This was made possible with a high NA diffraction-limited lens system, and a high dynamic range, high resolution camera. In this section, a system including linear phase modulation of the object wave and iterative phase recovery methods is discussed to improve a given lens system having low NA, low field of view and aberrations.

Low NA means filtering out high spatial frequencies on the spectral plane. Low field of view means small area of detection by the camera. Aberrations can be modeled as phase modulation on the spectral plane as discussed in the previous section. In order to bypass these problems, and/or to achieve higher resolution than what is possible with the given lens system and camera, we will consider a method similar to what is used in synthetic aperture microscope [Terry M. Turpin, Leslie H. Gesell, Jeffrey Lapides, Craig H. Price, "Theory of the synthetic aperture microscope," *Proc. SPIE* 2566, Advanced Imaging Technologies and Commercial Applications, doi:10.1117/12.217378, 23 Aug. 1995] and Fourier ptychographic imaging [G. Zheng, R. Horstmeyer, C. Yang, "Wide-field, high-resolution Fourier ptychographic microscopy," *Nature Photonics*, pp. 739-745, Vol. 7, September 2013]. For this purpose, the input object wave will be modulated (multiplied) by a number of plane waves given by $$u_{input}'(x,y) = u_{input}(x,y)\Box e^{j(k_{xm}x + k_{ym}y)} \quad m=1, 2, \ldots, M \qquad (26)$$

This can be achieved in a number of ways. For example, a LED matrix array can illuminate the 3-D object of interest with angle varied plane waves. Alternatively, a real-time reconfigurable array of diffraction gratings can be generated with spatial light modulators (SLM's) [S. Ahderom, M. Raisi, K. Lo, K. E. Alameh, R. Mavaddah, "Applications of Liquid crystal light modulators in optical communications," *Proceedings of 5th IEEE International Conference on High Speed Networks and Multimedia Communications*, Jeju Island, Korea, 2002].

For each m, the linear imaging system has an output image given by $$u_{output}'(x,y)=h(x,y)*u_{input}'(x,y) \qquad (27)$$

Assuming a diffraction-limited imaging system, the coherent transfer function is what governs imaging, and Eq. (24) in the spectral domain becomes $$U'(f_x,f_y)=H(f_x,f_y)U(f_x-f_{xm},f_y-f_{ym}) \qquad (28)$$

For example, when the wavelength $\lambda$ is 0.5 micron, the wave number becomes $$k_0=2\pi/\lambda=1.23 \cdot 10^{-5} \text{ m}^{-1}$$

The cutoff frequency for the CTF is $$f_c=NA \cdot k_0 \qquad (29)$$

When NA=0.1, and the DFT (image) size is 256×256, a 32×32 window of DFT spectral points fits right in to the CTF circle with radius $f_c$ equal to $1.257 \cdot 10^6$ m$^{-1}$. Let K×K be the number of plane waves needed to modulate the input wave. In this example, we get K=256/32=8.

Similarly, when NA=0.2 and the DFT (image) size is 256×256, a 64×64 window of DFT spectral points fits right in to the CTF circle with radius $f_c$ equal to $1.257 \cdot 10^6$ m$^{-1}$. In this case, for K×K number of plane waves needed to modulate the input wave, we get K=256/64=4.

Modern high resolution cameras such as 8K cameras support much higher number of pixels such as 8192×4320 pixels [https://www.usa.canon.com/internet/portal/us/home/products/details/cameras/eos-dslr-and-mirrorless-cameras/dslr/eos-5ds-r].

Since FFT's work best with powers of 2, let us assume a size of 4096×4096 pixels. When NA=0.2 and the DFT (image) size is 16384×16384, a 4096×4096 window of DFT spectral points fits right in to the CTF circle with radius $f_c$ equal to $1.257 \cdot 10^6$ m$^{-1}$. In this case, for K×K number of plane waves needed to modulate the input wave, we get K=16384/4096=4. In other words, this system would achieve superresolution with 16384×16384 pixels. By using all K×K plane waves, the amplitudes at 16384×16384 pixels are obtained with each input mask. The rest is processing with iterative phase recovery method iterations.

MASKS

A major consideration is how many masks are needed for an iterative phase recovery method to result in acceptable performance. Since each mask means another set of measurements, the fewer masks the better. In addition, the masks used seriously affect the quality of information reconstruction. Recovery of information can be considered in terms of input image amplitude recovery, phase recovery, or preferably both. This is different from phase recovery in the spectral domain. In other words, recovered phase in the spectral domain may give correct input image amplitude recovery, but not necessarily correct input image phase recovery or incomplete input image phase recovery. In the literature, what is usually reported is the input (wave) amplitude recovery. It is highly probable that the recovered input (wave) phase is not sufficiently correct. In accordance with embodiments of the present invention, complete input image amplitude recovery as well as input phase recovery is sought.

Another consideration is type of masks to be used. Reducing the number of masks is achievable in accordance with embodiments of the present invention. As explained above, in the first category, the first mask is a unity (clear, transparent, with all elements equal to +1) mask. The second mask can be (1) a phase mask with phase changing between 0 and $2\pi$ radians, (2) a quantized phase mask with elements equal to quantized phase values, (3) a bipolar binary mask with elements equal to +1 and −1, corresponding to quantized phases chosen as 0 and pi radians, (4) a pair of complementary masks, wherein corresponding elements of each mask in the pair are complementary with respect to amplitude. In the second category, the transparent mask is not required, rather, there are pairs of complementary binary masks, preferably two or more pairs. In particular, two pair of complementary unipolar (+1 and 0) binary masks can be used. If more number of masks are used, the number of phase recovery iterations may be reduced.

Embodiments of the present invention implement iterative phase recovery (version 1) with a unity mask in addition to one or more additional masks, or (version 2) pairs of unipolar masks complementary with respect to amplitude.

The unipolar binary mask is no longer a phase mask, but a binary amplitude mask. According to conventional thinking, amplitude masks do not work in general. On the other hand, unipolar binary masks would be desirable in many applications since they make implementation easier. In accordance with embodiments of the invention, unipolar binary masks are created in pairs. The second mask is the complement of the first mask. In other words to create the second mask, 0's and 1's are exchanged at every component of the first mask. This is also the case with pairs of unipolar binary masks in which 1's are replaced by phase factors whose amplitudes equal 1.

Figure 4:
FIG. 4 is a binary spatial mask when the aperture size is 16×16 pixels.
Figure 5:
FIG. 5 is a binary spatial mask when the aperture size is 8×8 pixels.

Each element in the masks has a finite size. So it is important, especially with optical implementations, that finite sized elements do not reduce performance. We claim that the iterative phase recovery methods function well with finite element sizes as well provided that they are sufficiently small. Sufficiently small is 16×16 in the binary bipolar case and 8×8 in the unipolar binary case. A binary mask for aperture size equal to 16×16 pixels is shown in FIG. 4. A binary mask with an aperture size equal to 8×8 pixels is shown in FIG. 5.

Experimental Results with Complex Waves using the Proposed Masks

Figure 6:
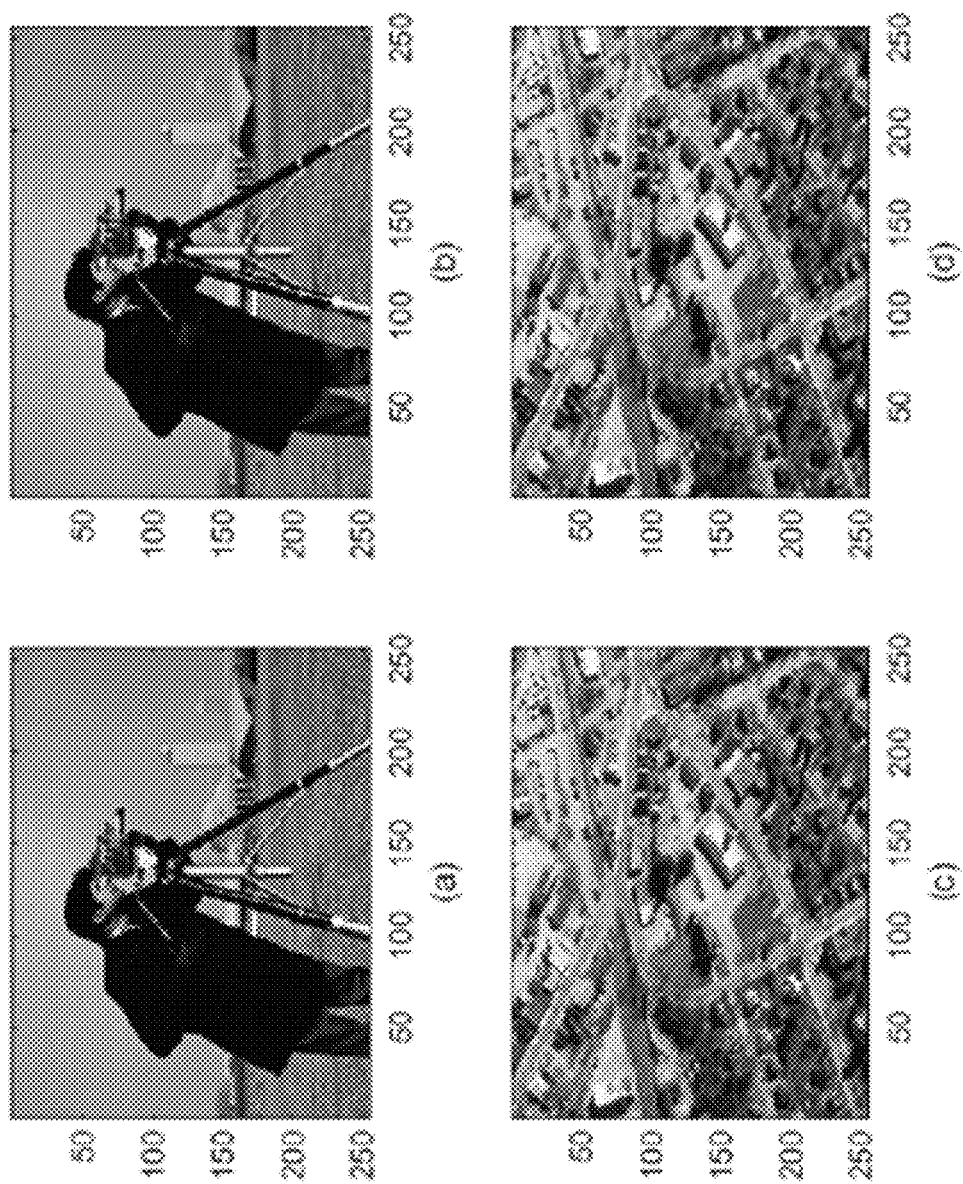
FIG. 6 shows the reconstruction results using G2 with one unity mask and one bipolar binary mask.
Figure 7:
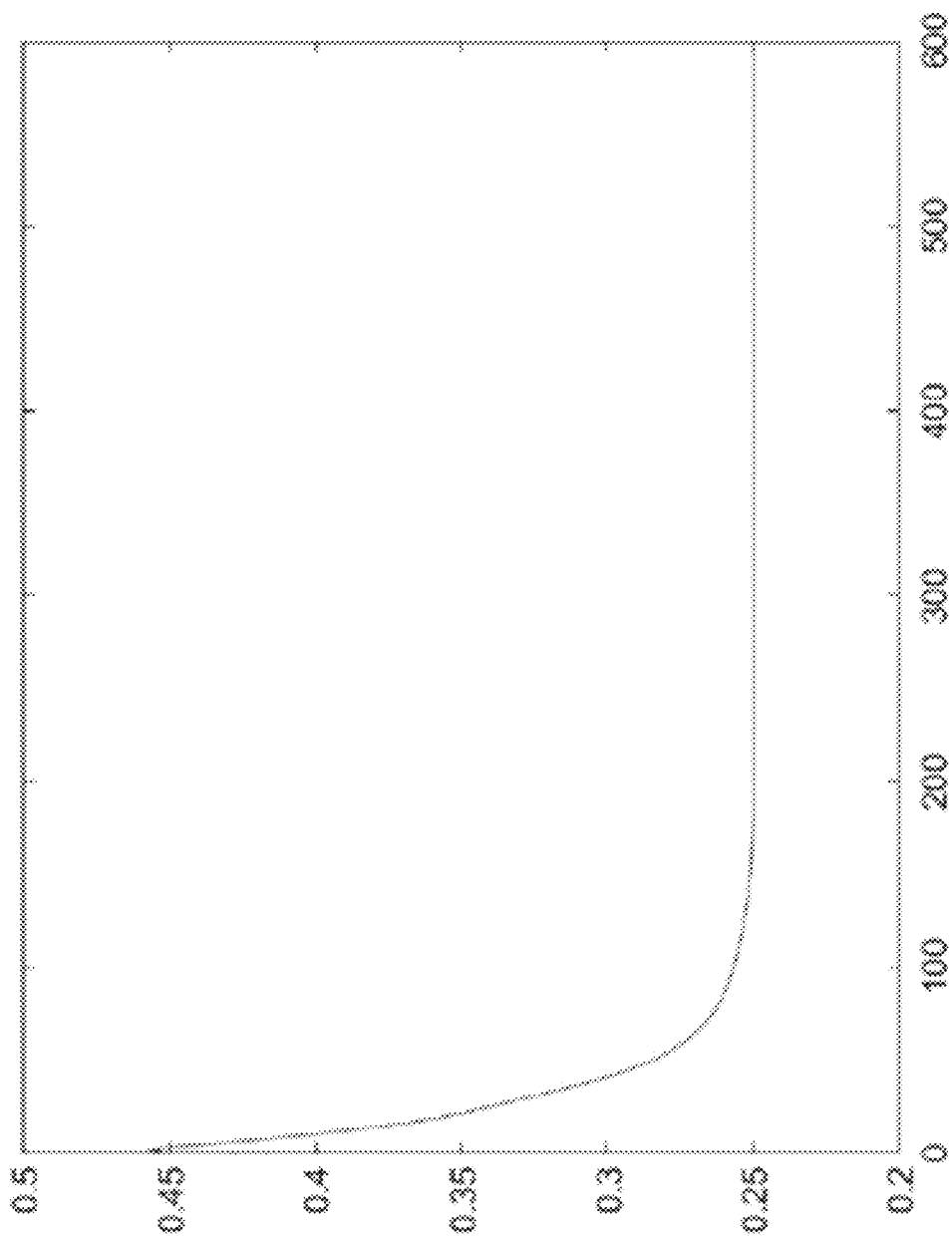
FIG. 7 shows the error reduction curve with one unity mask and one bipolar binary mask when the aperture size is 16×16 pixels.
Figure 8:
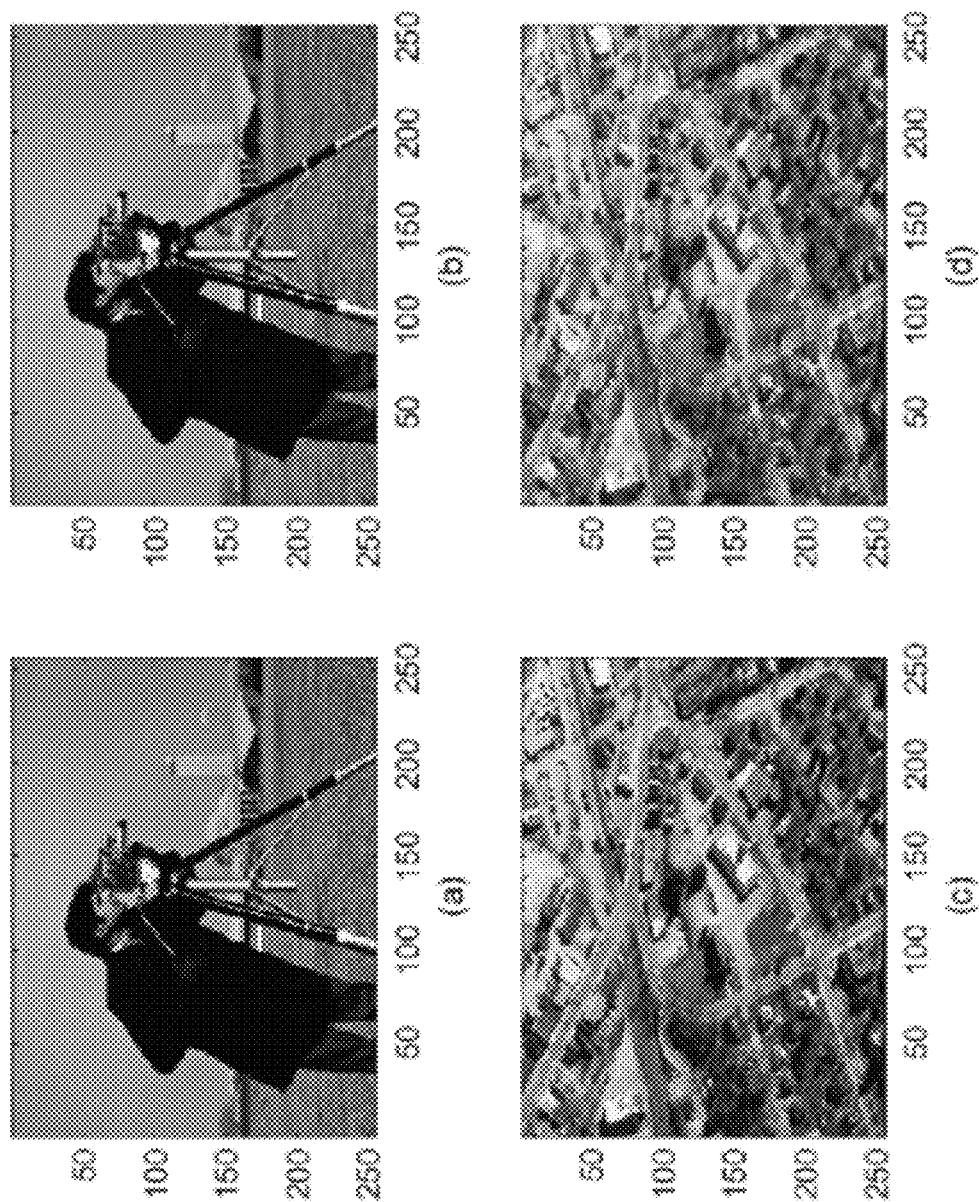
FIG. 8 shows reconstruction results using G2 with one pair of complementary unipolar binary masks.

Some experimental results are provided with a complex wave having amplitude (image) and phase (image) in FIGS. 6, 7, and 8. FIG. 6 shows the reconstruction results with a complex wave using G2 when one unity mask and one bipolar binary mask is used. The original amplitude image is shown at (a). The reconstructed amplitude image is shown at (b). The original phase image is shown at (c). The reconstructed phase image is shown at (d). FIG. 7 shows the corresponding error reduction curve during iterations.

FIG. 8 shows the reconstruction results with the same complex wave using G2 when one pair of complementary unipolar binary masks is used. The original amplitude image is shown at (a). The reconstructed amplitude image is shown at (b). The original phase image is shown at (c). The reconstructed phase image is shown at (d).

IMAGING OF DISTANT OBJECTS

In this section, we discuss iterative phase recovery for coherent imaging of objects which are considerably distant from the imaging lens system. In such a case, the field at the entrance of the imaging lens system is directly related to the Fourier transform of the wave coming from a thin object to be imaged. This is especially true in the Fraunhofer approximation for distant wave propagation, and can also be extended to not so distant propagation with Fresnel approximation in the following references: A. Eguchi, J. Brewer, T. D. Milster, "Optimization of random phase diversity for adaptive optics using an LCoS spatial light modulator," *Optics Letters,* Vol. 44, No. 21, 1 Nov. 2019, pp. 6834-6840, and A. Eguchi, T. D. Milster, " Single shot phase retrieval with complex diversity," *Optics Letters,* Vol. 44, No. 21, 1 Nov. 2019, pp. 5108-5111. In previous sections, the input to the lens system was the complex image. Now it is essentially a spectral image. We can consider passing the input wave through the input masks as done previously, followed by another generalized Fourier transform, for example by a lens, which would yield the object image inverted. Then, a camera would record the image. In this geometry, the system is the opposite of the previous systems, meaning the image plane and the spectral plane are exchanged. Unfortunately, iterative phase recovery may not function well under these conditions. The Fourier transform of the object image is usually concentrated at very small frequencies, and the remainder of the Fourier plane information is noiselike with small components, making the use of input masks ineffective.

To address these issues, the system shown in FIG. 1B-II can be used for coherent imaging of thin distant objects. As shown, the lens system may be designed for providing two Fourier transforms rather than one Fourier transform. The first Fourier transform 107 converts the input image (wave) to another image (wave). Then, the previous system is used. The input is passed through splitter(s) whose outputs are sent to the masks as before. The second Fourier transform 110 regenerates the modified spectral information due to masking for illuminating the image sensor 112. Thus, the part denoted by the lens system image plane including masks and the image sensor plane is the same as the system used previously.

ITERATIVE PHASE RECOVERY METHODS WITH MASKING

A number of iterative phase recovery methods have been used with masking. According to embodiments of the present invention, using a unity (clear) mask as one of the masks considerably improves the performance of the iterative phase recovery methods when using bipolar binary masks or phase masks. Also, the use of pairs of complementary binary masks in such systems (possibly without unity mask) are highly effective.

Figure 9A:
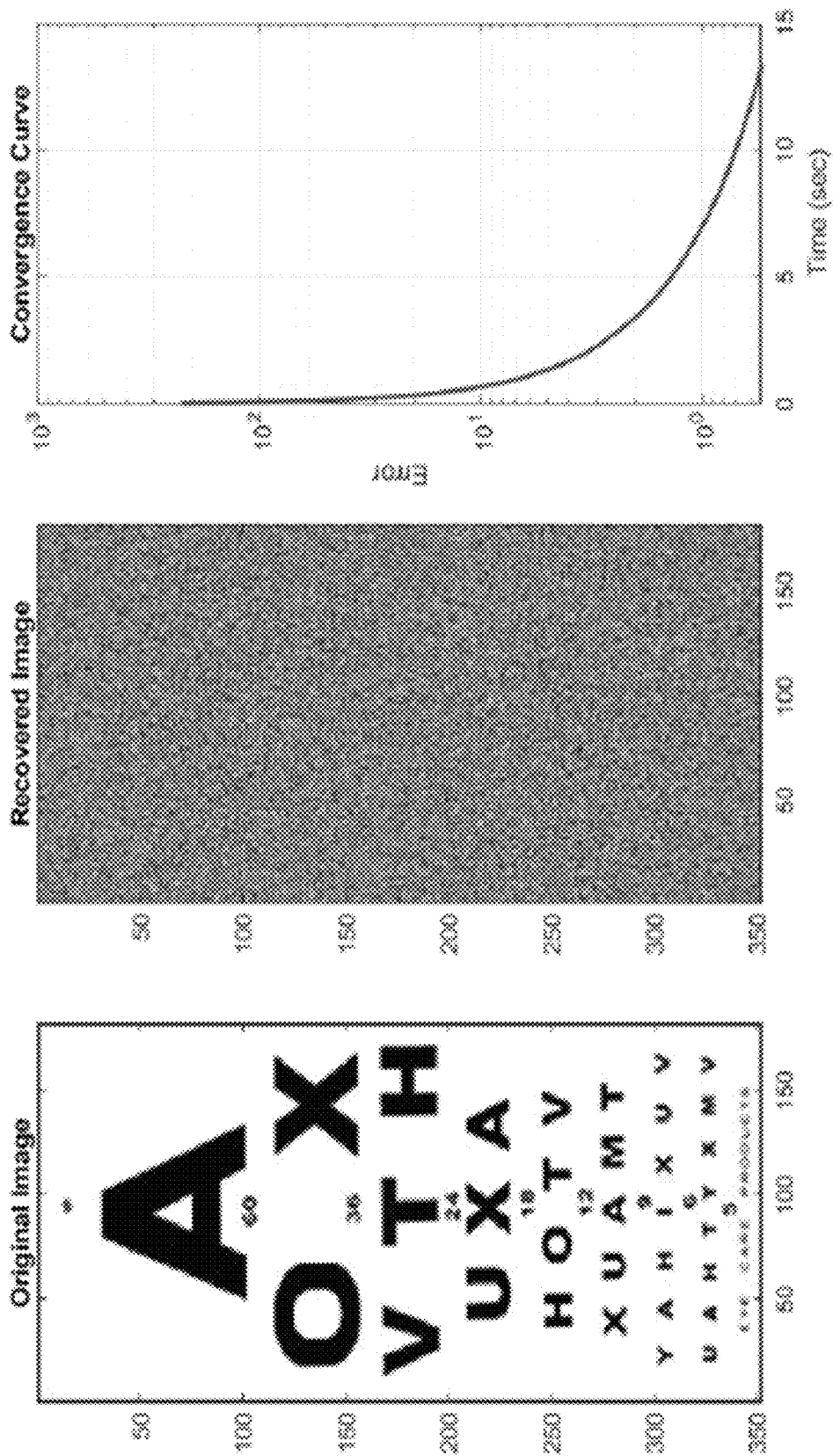
FIG. 9A shows the reconstruction results using 2 bipolar binary masks with the Fienup iterative phase recovery method.
Figure 9B:
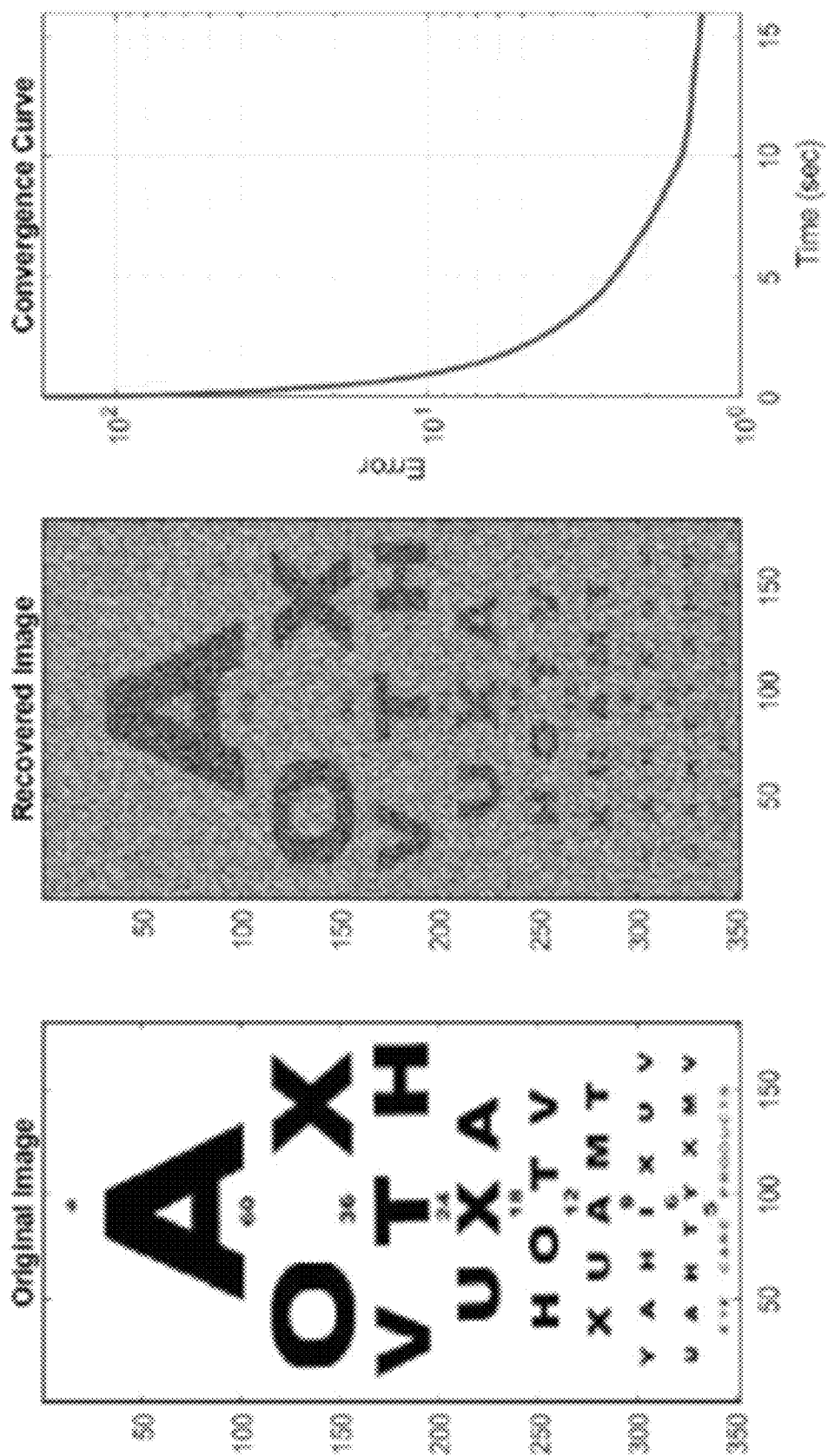
FIG. 9B shows the reconstruction results using 3 bipolar binary masks with the Fienup iterative phase recovery method.
Figure 10:
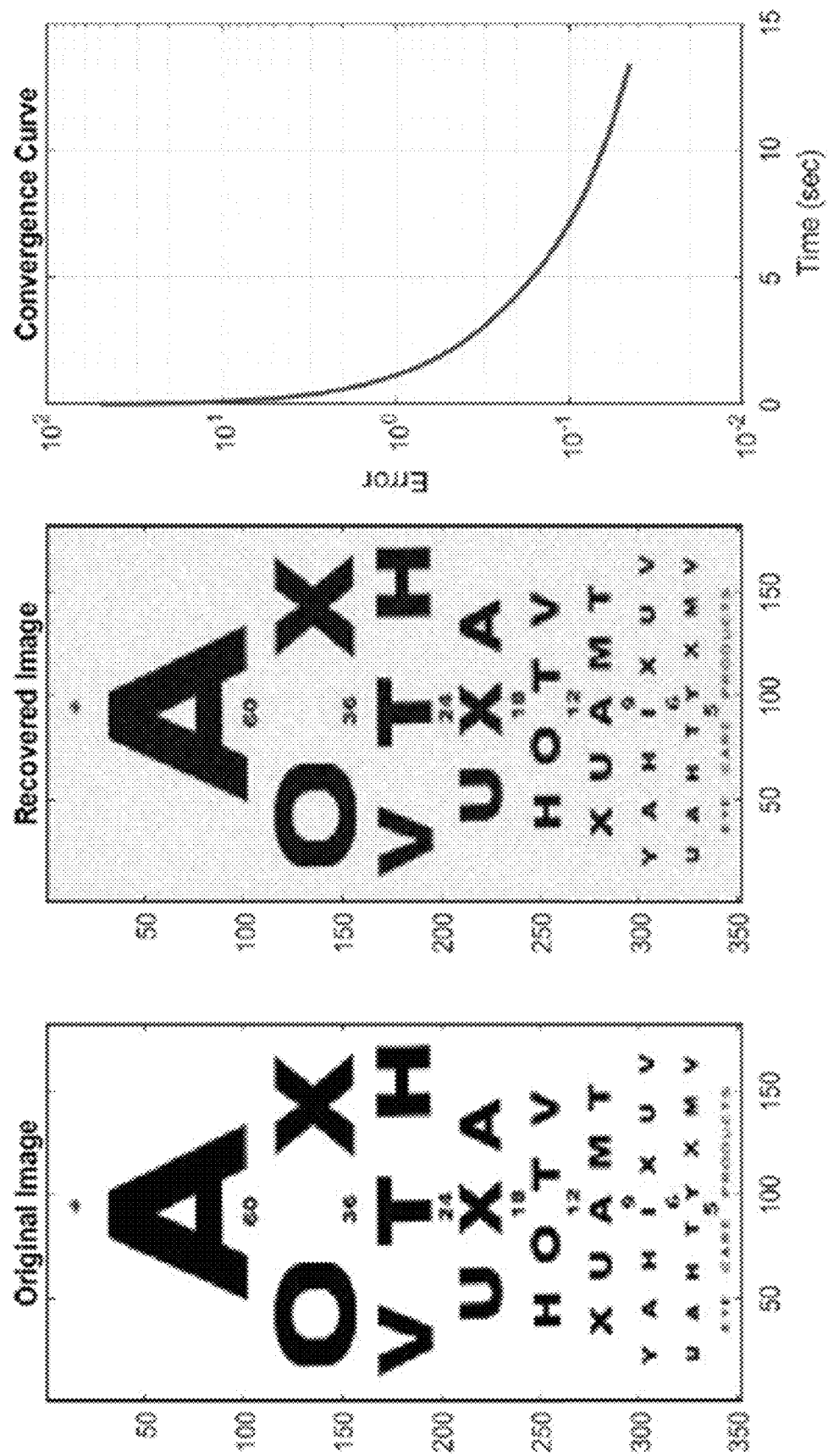
FIG. 10 shows the reconstruction results of an embodiment of the invention using one unity mask and one bipolar binary mask with the Fienup iterative phase recovery method.

The effectiveness of an embodiment of the invention was evaluated digitally. A simple FFT system was used with the digitally implemented masks without borders. Without losing generality, the coherent input was an amplitude image only, meaning the input phase is assumed to be zero at each pixel. FIG. 9A shows image recovery with the Fienup method when 2 bipolar binary masks were used. It is observed that the image is not recovered. The corresponding results with all the other methods were the same. The results were somewhat improved when using 3 bipolar binary masks. This is shown in FIG. 9B with the Fienup method. However, the results are still not satisfactory. Replacing one bipolar binary mask with a clear mask resulted in drastic improvement as shown in FIG. 10 where one clear mask and one bipolar binary mask resulted in image recovery.

Figure 11:
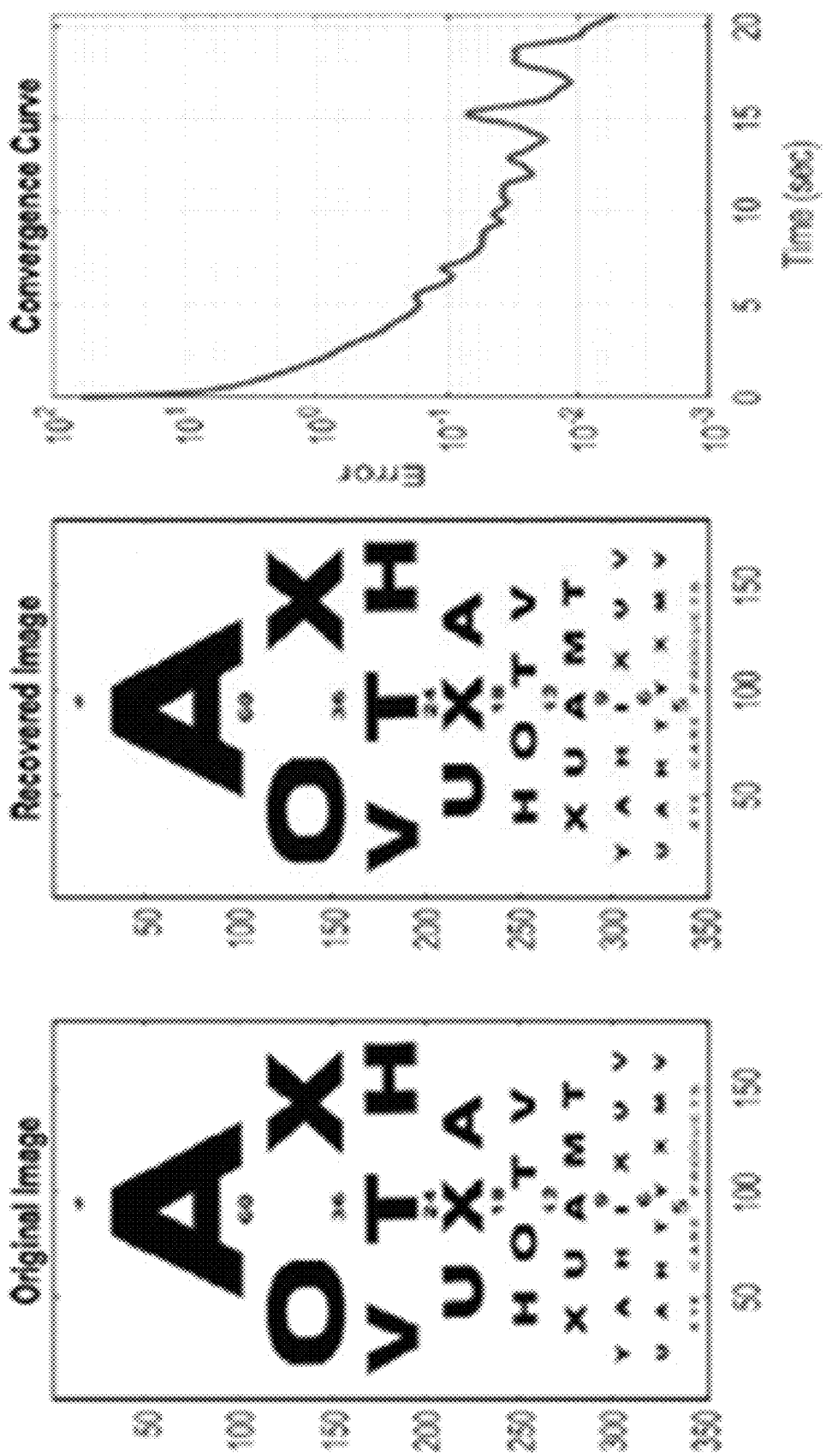
FIG. 11 is the reconstruction results of an embodiment of the invention using two pairs of complementary unipolar binary masks with the Fienup iterative phase recovery method.

The results with pairs of complementary unipolar binary masks showed that they are self-sufficient without a unity mask. FIG. 11 shows image recovery results with two pairs of complementary unipolar binary masks using the Fienup method. It is observed that 2 pairs of complementary masks produced better results than one pair of complementary masks. Beyond two pairs of masks, the results further improve marginally.

With other iterative phase recovery methods, the performance was very similar. Such methods include but are not limited to those listed in Table 1.

TABLE 1

Iterative Phase Recovery Methods.

| Method | Reference |
| --- | --- |
| WirtFlow (Wirtinger Flow Algorithm) | E. J. Candes, Y. Eldar, T. Strohmer, V, Voroninski, "Phase Retrieval via Matrix Completion," SIAM review, 57(2): 225-251, 2015 |
| TWF (Truncated Wirtinger Flow Algorithm (with Poisson loss)) | Yuxin Chen and Emmanuel J Candès, "Solving random quadratic systems of equations is nearly as easy as solving linear systems," https://arxiv.org/abs/1505.05114, 2015 |
| RWF (Reweighted Wirtinger Flow Algorithm) | Ziyang Yuan and Hongxia Wang, "Phase retrieval via reweighted wirtinger flow," Appl. Opt., 56(9): 2418-2427, March 2017 |
| AmplitudeFlow (Amplitude Flow Algorithm without truncation) | Gang Wang, Georgios B Giannakis, and Yonina C Eldar, "Solving systems of random quadratic equations via truncated amplitude flow," arXiv preprint arXiv: 1605.08285, 2016 |
| TAF (Truncated Amplitude Flow Algorithm) | Gang Wang, Georgios B Giannakis, and Yonina C Eldar, "Solving systems of random quadratic equations via truncated amplitude flow," arXiv preprint arXiv: 1605.08285, 2016 |
| RAF (Re-Weighted Amplitude Flow Algorithm) | G. Wang, G. B. Giannakis, Y. Saad, and J. Chen, "Solving Almost all Systems of Random Quadratic Equations," ArXiv e-prints, May 2017 |
| GerchbergSaxton (Gerchberg Saxton Algorithm) | R. W. Gerchberg, W. O. Saxton, "A practical algorithm for the determination of the phase from image and diffraction plane pictures," Optik, Vol. 35, pp. 237-246, 1972; R. W. Gerchberg, "A New Approach to Phase Retrieval of a Wave Front," Journal of Modern Optics, 49: 7, 1185-1196, 2002 |
| Fienup Algorithm | J. R. Fienup, "Phase retrieval algorithms, a comparison," Applied Optics, Vol. 21, No. 15, pp. 2758-2769, 1 Aug., 1982 |
| Kaczmarz Algorithm | Ke Wei, "Solving systems of phaseless equations via kaczmarz methods: A proof of concept study," Inverse Problems, 31(12): 125008, 2015 |
| PhaseMax Algorithm | Sohail Bahmani and Justin Romberg, "Phase retrieval meets statistical learning theory: A flexible convex relaxation," arXiv preprint arXiv: 1610.04210, 2016; |

TABLE 1-continued

Iterative Phase Recovery Methods.

| Method | Reference |
|---|---|
| | Tom Goldstein and Christoph Studer, "Phasemax: Convex phase retrieval via basis pursuit," arXiv preprint arXiv: 1610.07531, 2016 |

Table 2 shows the mean-square error performance with all the methods when using 3 bipolar binary masks versus 1 clear mask and 2 bipolar binary masks. It is observed that the error performances with large MSE error (Fienup, G2, TAF, Wirtflow) with no clear mask substantially improved after replacing one bipolar binary mask with a clear mask.

Table 3 shows how the number of iteration and computation time changes as a function of number pairs of complementary unipolar binary masks with the RAF method, for example. It is observed that the performance gets considerably better in terms of speed of computation as the number of pairs of masks increases to 3 for that method.

Table 4 shows the optimal number of pairs of complementary unipolar masks for best visual performance. This number is 2 (mostly) or 3.

TABLE 2

Error performance with 3 masks.

| Algorithm | MSE Error (no clear mask) | MSE Error (with clear mask) |
|---|---|---|
| TWF | 7.544e−05 | 5.36e−06 |
| Fienup | 1.341 | 9.91e−04 |
| G2 | 1.236 | 9.95e−04 |
| Amplitudeflow | 7.09e−05 | 7.08e−05 |
| Kaczmarz | 0.1965 | 0.134 |
| Phasemax | 2.296e+06 | 3.39e+05 |
| RAF | 7.25e−04 | 2.49e−04 |
| RWF | 4.84e−04 | 4.09e−04 |
| TAF | 0.0226 | 5.37e−05 |
| Wirtflow | 0.0199 | 2.1e−04 |

TABLE 3

Properties as a Function of Pairs of Complementary Unipolar Masks with the RAF method.

| Number of Mask Pairs | 1 | 2 | 3 | 4 |
|---|---|---|---|---|
| Number of Iterations | 106 | 49 | 22 | 17 |
| Computation Time (sec) | 12.32 | 8.72 | 7.25 | 7.26 |

TABLE 4

Optimal Number of Pairs of Complementary Unipolar Masks.

| Algorithm | Optimal Number |
|---|---|
| TWF | 2 |
| Fienup | 2 |
| G2 | 2 |
| Amplitudeflow | 2 |
| Kaczmarz | 3 |
| Phasemax | 2 |
| RAF | 3 |
| RWF | 1 |
| TAF | 3 |
| Wirtflow | 1 |

CONCLUDING REMARKS

Iterative phase recovery methods can be implemented digitally, for example, within a digital processor, such as a computer. The input may for example be a pre-recorded image or other array of points. In this case, a generalized FFT and generalized inverse FFT (IFFT) can be used. Using the word 'optical' in a general sense to encompass all waves, iterative phase recovery methods can also be implemented by a coherent optical or by a coherent optical/digital system. In these cases, the initial Fourier transform operation and amplitude detection is typically done by a lens/camera system. In the case of a coherent optical/digital system, wave amplitude information obtained by a lens/camera system is input to a computer system to carry out the iterations with FFT and IFFT in accordance with the iterative phase recovery method. This can be followed by possible other operations such as generation of 3-D images.

In a digital implementation, the input masks can be generated within a computer, possibly together with the complex input information. In a coherent optical or coherent optical/digital implementation, they can be implemented in real time by optical devices such as spatial light modulators and micromirror arrays.

Coherent optical systems are at least diffraction limited. This means a lens system acts as a lowpass filter characterized by a numerical aperture NA. Iterative phase recovery functions require that the system NA is sufficiently large. According to embodiments of the present invention, NA≥0.7 was found to be sufficient.

Coherent optical systems have aberrations. They are usually modeled as phase factors on the spectral plane of the system. For example, such modeling can be done in terms of polynomials expressing phase due to aberrations, such as Seidel aberrations and Zernicke polynomials. In a coherent system, aberration Phase factors appear as an additional phase to be added to the input spectral phase on the Fourier plane. The camera is sensitive to amplitude only, eliminating all aberrations which can be modeled as phase variations on the spectral plane. As such, spectral phase aberrations have no detrimental effect on the performance of spectral iterative phase recovery methods.

An optical system with limited NA and aberrations can be used to achieve superresolution by using iterative phase recovery methods and including linear phase modulation with the input information a number of times. The linear phase modulation part is like what is done in synthetic aperture microscopy and Fourier ptychographic imaging. Iterative phase recovery operates with the spectral amplitudes obtained from all the linearly phase modulated parts of input information with each mask to result in superresolved amplitude and phase information. Similar results can be achieved by moving the intensity sensor spatially instead of linear phase modulation after passing the input wave through each of the at least two physical spatial masks a number of times.

The input masks can be produced with elements, for example, elements having a finite size provided that the sizes are sufficiently small. In the case of unipolar binary masks, 8×8 elements or smaller resulted in satisfactory performance in digital experiments. In the case of bipolar binary masks, 16×16 elements or smaller resulted in satisfactory performance in digital experiments. Thus, the bipolar binary masks are more tolerant than unipolar binary masks. In either case, use of finite sized elements means simpler implementation.

Iterative phase recovery performs well in noise. Images heavily corrupted by noise can be recovered as they appear in noise. Further denoising can be used to generate clear images.

Coherent distant object imaging can be done with iterative phase recovery processing. Here the input image (wave) is already Fourier transformed due to coherent wave propagation and may be compressed. Then, one more Fourier transform generates the decompressed image (wave) information. The rest of the system is the same as what we utilized previously with masks and the iterative process of phase recovery.

When the input is an amplitude image only, phase is zero at each input point. Then excellent results can be achieved without a border region composed of zeros surrounding the input window.

The performance of an iterative phase recovery method is substantially increased by using the claimed methods and systems to reduce the computation time, to reduce the number of masks, to reduce the number of iterations, to increase the quality of reconstruction, and to increase the ease of implementation by using (1) a unity mask together with one or more bipolar binary masks with elements equal to 1 and −1, or (2) a unity mask together with one or more phase masks, or (3) a unity mask together with one pair of masks or more than one pair of masks having binary amplitudes of 0's and 1's, in which the masks in the pair are complementary to each other with respect to amplitude, or (4) one or more pairs of complementary masks with binary amplitudes of 0's and 1's without needing a unity mask. In all cases, it is possible to use outer borders filled with zeros. Use of borders, for example, by doubling the mask size and filling the outer border of the mask with zeros can improve the result. Using any of these combinations of specially selected masks can increase the quality of reconstruction and simplify implementation.

POTENTIAL CLAIMS

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method for recovering phase information from an array of points, each point having an amplitude, the method comprising:

providing at least one transformation unit having an input and a spectral output and at least two masks one of which is a unity mask, each of the at least two masks configured to operate upon the input of the at least one transformation unit;

separately applying the input to each of the at least two masks to generate a modified input from each of the masks;

performing, by the at least one transformation unit, a generalized Fourier transform on each modified input to produce transformed modified inputs;

recording amplitude values at an array of points of each transformed modified input to produce phasorgrams;

associating a phase value with each point on each phasorgram to form a plurality of complex phasorgrams; and iteratively processing the plurality of complex phasorgrams until convergence is achieved to produce a totagram constituting a reconstructed input with amplitude and phase information.

P2. The method of P1 wherein the array of points is a coherent light wave.

P3. The method of P1 wherein the array of points is digital data.

P4. The method of P1 or P3 wherein the at least one transformation unit is a generalized Fourier transform process run on a digital processor.

P5. The method of P1, P3 or P4 wherein the at least two masks are implemented on a digital processor.

P6. The method of P1 or P2, wherein the at least one transformation unit is a lens system.

P7. The method of P1, P2 or P6, wherein the masks are physical spatial masks and further comprising at least one of:

switching from one of the at least two physical spatial masks to another of the at least two physical spatial masks such that the input is individually received in sequence by each of the at least two physical spatial masks; and splitting the input wave so that it is individually received in parallel by each of the at least two physical spatial masks.

P8. The method of P1, P2, P6 or P7, wherein the at least two masks comprise physical spatial masks implemented in real time by optical devices including any of spatial light modulators and micromirror arrays.

P9. The method of P1, P2, P6, P7 or P8, wherein recording is performed by an intensity sensor.

P10. The method of P1, P2, P6, P7, P8 or P9, further comprising (1) performing linear phase modulation on the input wave prior to passing the input wave through each of the at least two physical spatial masks a number of times, or (2) moving the intensity sensor spatially after passing the input wave through each of the at least two physical spatial masks, to generate superresolved amplitude and phase information of the input wave a number of times.

P11. The method of P1, P2, P6, P7, P8, P9 or P10 further comprising performing a generalized Fourier transform on the input through a lens prior to separately applying the input to each of the at least two masks.

P12. The method of any of the preceding potential claims wherein each mask includes an outer border that sets amplitude of points coinciding with the outer border to zero.

P13. The method of any of the preceding potential claims, wherein the at least two masks consist of the unity mask and a complex phase mask.

P14. The method of P13, wherein the complex phase mask comprises a bipolar binary mask.

P15. The method of any of potential claims P1 through P12, wherein the at least two masks consist of the unity mask and a pair of masks, wherein the masks in the pair are complementary with each other with respect to amplitude equal to 0 or 1.

P16. The method of P15, wherein the pair of masks are complementary unipolar binary masks.

P17. The method of P15, wherein the pair of masks include unity elements that have a phase factor.

P18. The method of any of the preceding claims further comprising, after completion, using the totagram to generate a representation of the information embedded in the reconstructed amplitude and phase of the input.

P19. The method of any of the preceding claims, wherein iteratively processing the plurality of complex phasorgrams comprises
(a) processing the plurality of complex phasorgrams to obtain a single estimate of the input by performing on the complex phasorgrams an inverse generalized Fourier transform and averaging complex information at each point of the input plane, and possibly some other additional optimization steps;
(b) passing the single estimate of the input through a process replicating each of the masks to obtain a plurality of intermediate arrays;
(c) performing a generalized fast Fourier transform on each of the intermediate arrays and replacing amplitude values at each point in the transformed intermediate arrays with corresponding recorded amplitude values, and possibly some other additional optimization steps, to generate another plurality of complex phasorgrams; and
(d) repeating step (a) for the another plurality of complex phasorgrams followed by steps (b) and (c) until convergence is achieved, wherein upon completion the single estimate of the input is the totagram.

P20. The method of P19, wherein convergence is determined by any of (1) when a squared difference between successive single estimates reach a predetermined threshold, and (2) when a given number of iterations of step (a) is completed.

P21. A method for recovering phase information from an array of points, each point having an amplitude, the method comprising:
providing at least one transformation unit having an input and a spectral output and at least two masks including at least one pair of masks binary in amplitude, wherein the masks in a pair are complementary with each other with respect to amplitude, each of the at least two masks configured to operate upon the input of the at least one transformation unit;
separately applying the input to each of the at least two masks to generate a modified input from each of the masks;
performing, by the at least one transformation unit, a generalized Fourier transform on each modified input to produce transformed modified inputs;
recording amplitude values at an array of points of each transformed modified input to produce phasorgrams;
associating a phase value with each point on each phasorgram to form a plurality of complex phasorgrams, and possibly some other additional optimization steps; and
iteratively processing the plurality of complex phasorgrams until convergence is achieved to produce a totagram constituting a reconstructed input with amplitude and phase information.

P22. The method of P21 wherein the array of points is a coherent light wave.

P23. The method of P21 wherein the array of points is digital data.

P24. The method of P21 or P23 wherein the at least one transformation unit is a generalized Fourier transform process run on a digital processor.

P25. The method of P21, P23 or P24 wherein the at least two masks are implemented on a digital processor.

P26. The method of P21 or P22, wherein the at least one transformation unit is a lens system.

P27. The method of P21, P22 or P26, wherein the masks are physical spatial masks and further comprising at least one of:
switching from one of the at least two physical spatial masks to another of the at least two physical spatial masks such that the input is individually received in sequence by each of the at least two physical spatial masks; and
splitting the input wave so that it is individually received in parallel by each of the at least two physical spatial masks.

P28. The method of P21, P22, P26 or P27, wherein the at least two masks comprise physical spatial masks implemented in real time by optical devices including any of spatial light modulators and micromirror arrays.

P29. The method of P21, P22, P26, P27, P28 or P29, wherein recording is performed by an intensity sensor.

P30. The method of P21, P22, P26, P27, P28 or P29, further comprising (1) performing linear phase modulation on the input wave, prior to passing the input wave through each of the at least two physical spatial masks a number of times, or (2) moving the intensity sensor spatially after passing the input wave through each of the at least two physical spatial masks a number of times, to generate superresolved amplitude and phase information of the input wave.

P31. The method of P21, P22, P26, P27, P28, P29 or P30 further comprising performing a generalized Fourier transform on the input through a lens prior to separately applying the input to each of the at least two masks.

P32. The method of any of the preceding potential claims wherein each mask includes an outer border that sets phase and amplitude of points coinciding with the outer border to zero.

P33. The method of any of P21 through P32, wherein the at least two masks consists of one pair of complementary unipolar binary masks.

P34. The method of any of P21 through P32, wherein the pair of masks include unity elements that have a phase factor.

P35. The method of any of P21 through P32, wherein the at least two masks consists of two pairs of complementary unipolar binary masks.

P36. The method of any of the preceding claims further comprising, after completion, using the totagram to generate a representation of the information embedded in the reconstructed amplitude and phase of the input.

P37. The method of any of the preceding claims, wherein iteratively processing the plurality of complex phasorgrams comprises
(a) processing the plurality of complex phasorgrams to obtain a single estimate of the input by performing on the complex phasorgrams an inverse generalized Fourier transform and averaging complex information at each point at corresponding locations, and possibly some other additional optimization steps;

(b) passing the single estimate of the input through a process replicating each of the masks to obtain a plurality of intermediate arrays;

(c) performing a generalized fast Fourier transform on each of the intermediate arrays and replacing amplitude values at each point in the transformed intermediate arrays with corresponding recorded amplitude values, and possibly some other additional optimization steps, to generate another plurality of complex phasorgrams; and (d) repeating step (a) for another plurality of complex phasorgrams followed by steps (b) and (c) until convergence is achieved, wherein upon completion the single estimate of the input is the totagram.

P38. The method of P37, wherein convergence is determined by any of (1) when a squared difference between successive single estimates reach a predetermined threshold, and (2) when a given number of iterations of step (a) is completed.

P39. A system for recovering phase information from an input wave comprising:

an optical lens system having an input with a spectral output;

at least two physical spatial masks, each of the at least two physical spatial masks being disposed at the input of the optical lens system for receiving the input wave;

wherein the at least two physical spatial masks are configured to separately modify the input wave, and wherein the optical lens system effects a generalized Fourier transform on the separately modified waves to produce transformed waves;

at least one sensor system configured to record amplitude values at an array of points of each transformed wave at the spectral plane to produce phasorgrams; and a digital processor configured to:

associate a phase value with each point on each phasorgram to form a plurality of complex phasorgrams; and iteratively process the plurality of complex phasorgrams until convergence is achieved to produce a totagram constituting a reconstructed input wave with amplitude and phase information.

P40. The system of P39, further comprising a beam splitter configured to provide the input wave to each of the at least two physical spatial masks in parallel.

P41. The system of P39, further comprising a spatial light modulator configured to implement the at least two physical spatial masks switching from one of the masks to another of the at least two physical spatial masks such that the input is individually received in sequence by each of the at least two physical spatial masks.

P42. The system of P39, further comprising a micromirror array configured to implement the at least two physical spatial masks switching from one of the masks to another of the at least two physical spatial masks such that the input is individually received in sequence by each of the at least two physical spatial masks.

P43. The system of any of P39 through P42, wherein the at least one sensor system is an intensity sensor.

P44. The system of P39 through P43, further comprising a second lens positioned to receive the input wave en route to the at least two physical spatial masks.

P45. The system of any of P39 through P44 wherein each mask includes an outer border that sets phase and amplitude of points coinciding with the outer border to zero.

P46. The system of any of the P39 through P45, wherein the at least two masks include a unity mask.

P47. The system of P46 wherein the at least two masks consist of a unity mask and a complex phase mask.

P48. The system of P47, wherein the complex phase mask comprises a bipolar binary mask.

P49. The system of any of potential claims P39 through P46, wherein the at least two masks consist of the unity mask and a pair of masks, wherein the masks in the pair are complementary with each other with respect to amplitude.

P50. The system of P49, wherein the pair of masks are complementary unipolar binary masks.

P51. The system of P49, wherein the pair of masks include unity elements that have a phase factor.

P52. The system of any of potential claims P39 through P45, wherein the at least two masks comprise at least one a pair of masks, wherein the masks in the pair are complementary with each other with respect to amplitude.

P53. The system of P52, wherein the pair of masks are complementary unipolar binary masks.

P54. The system of P53, wherein the at least two masks consist of the pair of complementary unipolar binary masks.

P55. The system of P52, wherein the pair of masks include unity elements that have a phase factor.

P56. The system of any of P39 through P55, wherein to iteratively process the plurality of complex phasorgrams comprises (a) processing the plurality of complex phasorgrams to obtain a single estimate of the input waveform by performing on the complex phasorgrams an inverse generalized Fourier transform, averaging complex information at each point at corresponding locations, and possibly some other additional optimization steps;

(b) passing the single estimate of the input through a process replicating each of the masks to obtain a plurality of intermediate arrays;

(c) performing a generalized fast Fourier transform on each of the intermediate arrays and replacing amplitude values at each point in the transformed intermediate arrays with corresponding recorded amplitude values to generate another plurality of complex phasorgrams, and possibly some other additional optimization steps; and (d) repeating step (a) for the another plurality of complex phasorgrams followed by steps (b) and (c) until convergence is achieved, wherein upon completion the single estimate of the input is the totagram.

P57. The system of P56, wherein convergence is determined by any of (1) when a squared difference between successive single estimates reach a predetermined threshold, and (2) when a given number of iterations of step (a) is completed.

P58. The method of P15, wherein the pair of masks are complementary bipolar binary masks.

P59. The method of any of P21 through P32, wherein the at least two masks consists of one pair of complementary bipolar binary masks.

P60. The system of P49, wherein the pair of masks are complementary bipolar binary masks.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for recovering coherent wave phase information from an array of points, each point having an amplitude, the method comprising:

providing at least first and second physical spatial masks, wherein the first mask is a transparent mask having an outer border that sets phase and amplitude of points coinciding with the outer border to zero;
separately applying the array of points at the input to each of the first and second physical spatial masks to generate a modified input from each of the masks;
performing a generalized Fourier transform on each modified input to produce a transformed modified input from each modified input;
recording amplitude values at an array of points of each transformed modified input to produce phasorgrams;
associating a phase value with each point on each phasorgram to form a plurality of complex phasorgrams; and
iteratively processing the plurality of complex phasorgrams, until convergence is achieved to produce a totagram constituting a reconstructed input with amplitude and phase information.

2. The method of claim 1 wherein each mask includes an outer border that sets phase and amplitude of points coinciding with the outer border to zero.

3. The method of claim 1 wherein the at least first and second physical spatial masks include a pair of complementary unipolar binary masks.

4. The method of claim 1, wherein the input is a coherent wave and further comprising:
switching from one of the physical spatial masks to another of the physical spatial masks such that the input is individually received in sequence by each of the physical spatial masks.

5. The method of claim 1, wherein the input is a coherent wave and further comprising:
splitting the input wave so that it is individually received in parallel by each of the physical spatial masks.

6. The method of claim 1, wherein the input comprises a coherent wave and the physical spatial masks are implemented in real time by optical devices including any of spatial light modulators and micromirror arrays.

7. The method of claim 6, further comprising performing (1) linear phase modulation on the input wave, prior to passing the input wave through each of the physical spatial masks a number of times, or (2) moving the intensity sensor spatially after passing the input wave through each of the physical spatial masks a number of times, to generate superresolved amplitude and phase information of the input wave.

8. The method of claim 6, wherein recording is performed by an intensity sensor and the step of performing the generalized Fourier transform comprises using a lens system.

9. The method of claim 1, further comprising, after completion, using the totagram to generate a representation of the information embedded in the reconstructed amplitude and phase of the input.

10. A system for recovering coherent phase information from an input wave comprising:
an optical lens system having an input with a spectral output;
at least two physical spatial masks including at least one transparent mask having an outer border that sets phase and amplitude of points coinciding with the outer border to zero each of the at least two physical spatial masks being disposed at the input of the optical lens system for receiving the input wave;
wherein the at least two physical spatial masks are configured to separately modify the input wave, and wherein the optical lens system effects a generalized Fourier transform on each of the separately modified waves to produce a transformed wave from each of the separately modified waves;
at least one sensor system configured to record amplitude values at an array of points of each transformed wave at the spectral output to produce a phasorgram from each transformed wave; and
a digital hardware processor configured to:
associate a phase value with each point on each phasorgram to form a plurality of complex phasorgrams; and
iteratively process the plurality of complex phasorgrams until convergence is achieved to produce a totagram constituting a reconstructed input wave with amplitude and phase information.

11. The system of claim 10, wherein each physical spatial mask is surrounded by an outer border that blocks the wave, thereby setting phase and amplitude of points that coincide with the border to zero.

12. The system of claim 10, wherein to iteratively process the plurality of complex phasorgrams comprises
(a) processing the plurality of complex phasorgrams to obtain a single estimate of the input wave by performing on the complex phasorgrams an inverse generalized Fourier transform and averaging complex information at each point at corresponding locations;
(b) passing the single estimate of the input wave through a process replicating each of the physical spatial masks to obtain a plurality of intermediate arrays;
(c) performing a generalized fast Fourier transform on each of the intermediate arrays and replacing amplitude values at each point in the transformed intermediate arrays with corresponding recorded amplitude values to generate another plurality of complex phasorgrams; and
(d) repeating step (a) for the another plurality of complex phasorgrams followed by steps (b) and (c) until convergence is achieved, wherein upon completion the single estimate of the input is the totagram.

13. The system of claim 12, wherein convergence is determined by any of (1) when a difference between successive single estimates reach a predetermined threshold, and (2) when a given number of iterations of step (a) is completed.

14. The system of claim 10, wherein the at least two physical spatial masks includes a bipolar binary mask.

15. The system of claim 10 wherein of the at least two physical spatial masks include a pair of complementary unipolar binary masks.

16. A method for recovering phase information from an input array of points, each point having an amplitude, the method comprising:
providing at least two physical spatial masks including at least one transparent mask having an outer border that sets phase and amplitude of points coinciding with the outer border to zero;
separately applying the input array of points to each of the at least two physical spatial masks to generate a modified input from each of the masks;
performing, by at least one digital hardware processor, a generalized Fourier transform on each modified input to produce a transformed modified input from each modified input;
recording amplitude values at an array of points of each transformed modified input to produce phasorgrams;
associating a phase value with each point on each phasorgram to form a plurality of complex phasorgrams; and iteratively processing the plurality of complex phasorgrams until convergence is achieved to produce a totagram constituting a reconstructed input with amplitude and phase information, wherein iteratively processing the plurality of complex phasorgrams comprises:
- (a) processing the plurality of complex phasorgrams to obtain a single estimate of the input by performing on the complex phasorgrams an inverse generalized Fourier transform and averaging complex information at each point at corresponding locations;
- (b) passing the single estimate of the input through a process replicating each of the masks to obtain a plurality of intermediate arrays;
- (c) performing a generalized fast Fourier transform on each of the intermediate arrays and replacing amplitude values at each point in the transformed intermediate arrays with corresponding recorded amplitude values, to generate another plurality of complex phasorgrams; and
- (d) repeating step (a) for another plurality of complex phasorgrams followed by steps (b) and (c) until convergence is achieved, wherein upon completion the single estimate of the input is the totagram.

17. The method of 16 wherein the array of points is a coherent light wave.

18. The method of 16 wherein the array of points is digital data.

19. The method of claim 16, further comprising switching from one of the at least two physical spatial masks to another of the at least two physical spatial masks such that the input is individually received in sequence by each of the at least two physical spatial masks.

20. The method of claim 16, further comprising splitting the input wave so that it is individually received in parallel by each of the at least two physical spatial masks.

21. The method of claim 16, wherein the at least two physical spatial masks are implemented in real time by optical devices including any of spatial light modulators and micromirror arrays.

22. The method of claim 16, wherein recording is performed by an intensity sensor.

23. The method of claim 16, further comprising (1) performing linear phase modulation on the input wave, prior to passing the input wave through each of the at least two physical spatial masks a number of times, or (2) moving the intensity sensor spatially after passing the input wave through each of the at least two physical spatial masks a number of times, to generate superresolved amplitude and phase information of the input wave.

24. The method of claim 16 wherein each physical spatial mask includes an outer border that sets phase and amplitude of points coinciding with the outer border to zero.

25. The method of claim 16, wherein the at least two physical spatial masks further comprise one pair of complementary unipolar binary masks.

26. The method of claim 16, wherein the at least two physical spatial masks consist of two pairs of complementary unipolar binary masks.

27. The method of claim 16, wherein convergence is determined by any of (1) when a squared difference between successive single estimates reach a predetermined threshold, and (2) when a given number of iterations of step (a) is completed.

* * * * *